United States Patent
Li et al.

(10) Patent No.: US 11,644,630 B2
(45) Date of Patent: *May 9, 2023

(54) HIGH-DENSITY OPTICAL FIBER RIBBON INTERCONNECT AND METHOD OF MAKING

(71) Applicant: CORNING INCORPORATED, Corning, NY (US)

(72) Inventors: Ming-Jun Li, Horseheads, NY (US); Qi Wu, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/671,866

(22) Filed: Feb. 15, 2022

(65) Prior Publication Data

US 2022/0171145 A1    Jun. 2, 2022

Related U.S. Application Data

(63) Continuation of application No. 16/689,144, filed on Nov. 20, 2019, now Pat. No. 11,287,588.

(60) Provisional application No. 62/778,593, filed on Dec. 12, 2018.

(51) Int. Cl.
    *G02B 6/44*    (2006.01)
    *G02B 6/38*    (2006.01)

(52) U.S. Cl.
    CPC ......... *G02B 6/4403* (2013.01); *G02B 6/3885* (2013.01); *G02B 6/443* (2013.01)

(58) Field of Classification Search
    CPC ..... G02B 6/3885; G02B 6/4403; G02B 6/443
    See application file for complete search history.

(56) References Cited

U.S. PATENT DOCUMENTS

| 4,900,126 | A | 2/1990 | Jackson et al. |
| 5,140,665 | A | 8/1992 | Backer et al. |
| 5,457,762 | A | 10/1995 | Lochkovic et al. |
| 5,644,670 | A | 7/1997 | Fukuda et al. |
| 5,868,734 | A | 2/1999 | Soufiane et al. |
| 6,269,210 | B1 | 7/2001 | Yagi et al. |
| 6,905,257 | B2 | 6/2005 | Eichenberger et al. |
| 9,046,670 | B2 | 6/2015 | White |
| 9,766,397 | B2 | 9/2017 | Homma |
| 11,243,348 | B2* | 2/2022 | Brown ............... G02B 6/448 |
| 11,287,588 | B2* | 3/2022 | Li ..................... G02B 6/3885 |
| 2003/0044141 | A1 | 3/2003 | Melton et al. |

(Continued)

OTHER PUBLICATIONS

Bickham, "Multimode and single-mode fibers for data center and high-performance computing applications," Proceedings of SPIE—The International Society for Optical Engineering, v 9753, 2016, 8 pgs.

(Continued)

*Primary Examiner* — Daniel Petkovsek
(74) *Attorney, Agent, or Firm* — Adam R. Weeks

(57) ABSTRACT

A fiber ribbon interconnect may include a fiber ribbon, a first optical connector at a first end of the fiber ribbon, and a second optical connector at a second end of the fiber ribbon. The fiber ribbon includes two or more cladding-strengthened glass optical fibers each having an outer surface. The fiber ribbon also includes a common protective coating that surrounds the outer surfaces of the two or more cladding-strengthened glass optical fibers.

18 Claims, 21 Drawing Sheets

(56) References Cited

U.S. PATENT DOCUMENTS

| | | |
|---|---|---|
| 2003/0103743 A1 | 6/2003 | Sun et al. |
| 2011/0211797 A1 | 9/2011 | Bennett et al. |
| 2017/0068060 A1 | 3/2017 | Benjamin et al. |
| 2019/0154935 A1 | 5/2019 | Scherwin et al. |
| 2020/0012047 A1 | 1/2020 | Wu |
| 2020/0192023 A1 | 6/2020 | Brown et al. |

OTHER PUBLICATIONS

Chang et al., "Space-Efficient Single-Mode Fiber with Reduced Cladding Diameter," 2015 Opto-Electronics and Communications Conference, OECC 2015, Nov. 30, 2015, 2 pgs.

Estep et al., "The effect of carbon overcoating on the mechanical behavior of large flaws," SPIE vol. 1791, pp. 18-24, 1992.

Vethanayagam et al., "Mechanical performance and reliability of Corning Titan SMF CPC5 fiber after exposure to a variety of environments," Proc. SPIE, vol. 1366, pp. 343-350, 1991.

Wolfe, "TITAN SMF single-mode optical fiber," Proc. 2 Annual Broadband Expo 14 Fiber Opt Commun. Local Area Network Expo BROADBAND 90, p. 192-196, 1990.

\* cited by examiner

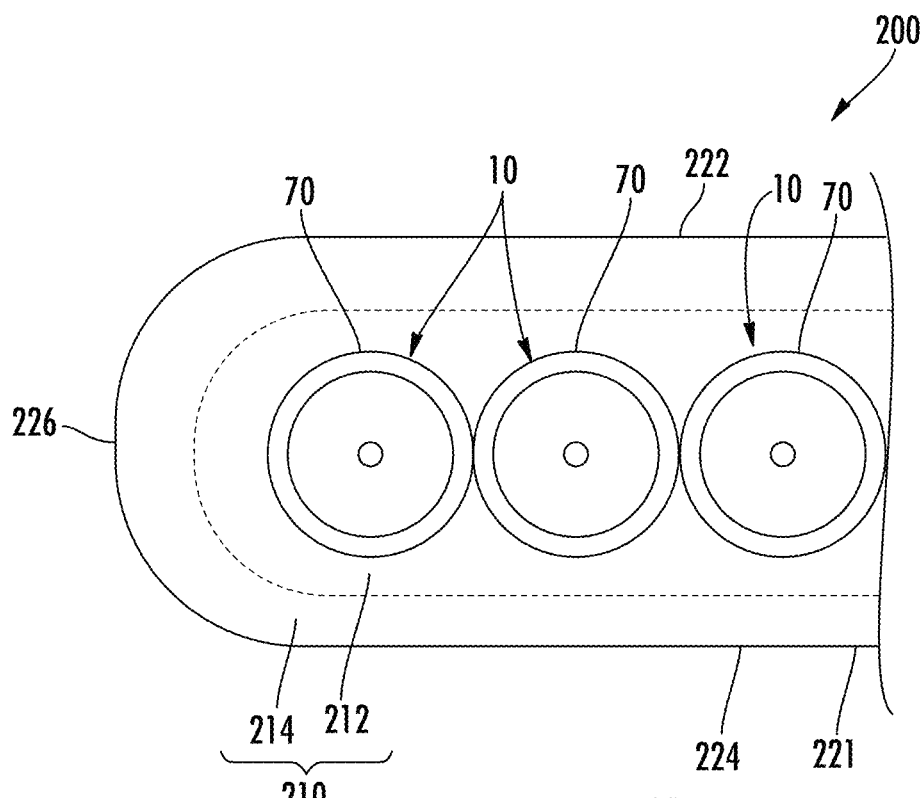
FIG. 4D
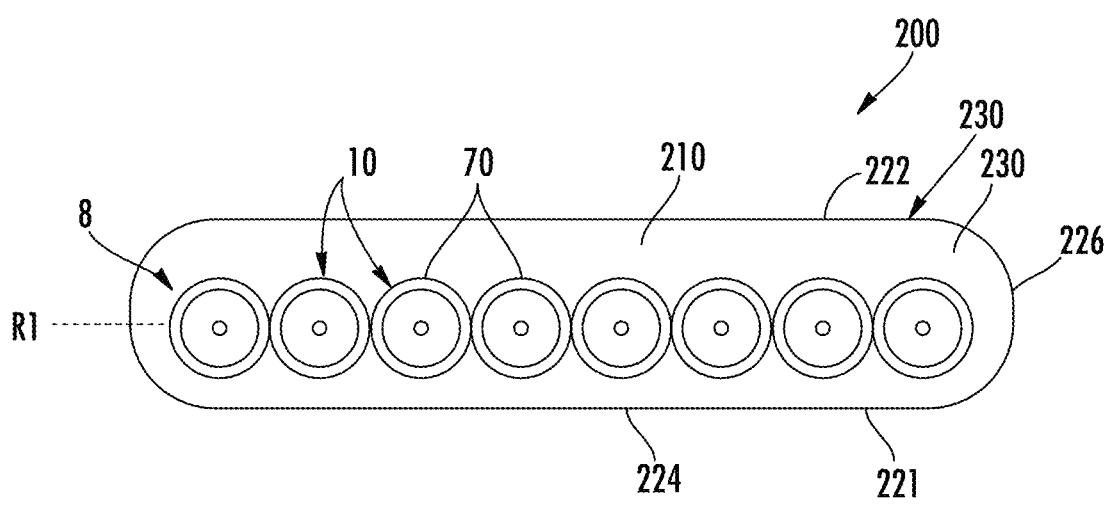
FIG. 4E
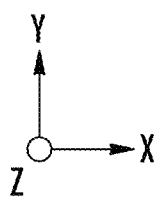

HIGH-DENSITY OPTICAL FIBER RIBBON INTERCONNECT AND METHOD OF MAKING

PRIORITY APPLICATION

This application is a continuation of U.S. patent application Ser. No. 16/689,144, filed on Nov. 20, 2019, now U.S. Pat. No. 11,287,588, which claims the benefit of priority of U.S. Provisional Application No. 62/778,593, filed on Dec. 12, 2018, both applications being incorporated herein by reference.

FIELD

The present disclosure relates to optical fiber ribbon interconnects, and in particular to a high-density optical fiber ribbon interconnect with a fiber ribbon having cladding-strengthened glass optical fibers in a common protective coating.

BACKGROUND

The push for higher data rates in digital communications has driven the integration of optics with electronics. In particular, the use of silicon photonics for electro-optical transceivers has resulted in very dense optical circuitry concentrating many separate optical signal lines in the form of optical waveguides (e.g., channel waveguides) into one silicon photonics chip. For many optical signal transmission applications, the optical signals generated on the silicon photonics chips need to be coupled from the optical waveguides into optical fibers. Likewise, optical signals generated at a remote location (e.g., a telecommunications device) need to be coupled from optical fibers to the optical waveguides to be detected by the silicon photonics chip.

Optical fiber ribbons and multicore optical fibers are two approaches to increase the fiber density to achieve the parallel connectivity required for the optical circuitry of silicon photonics chips. Unfortunately, using conventional optical fibers in a fiber ribbon does not result in a sufficiently high fiber density due to their relatively large size (as defined by the core, cladding and protective coating) as compared to the size of the optical waveguides of the silicon photonics chips. Likewise, the use of multicore optical fibers is problematic due to manufacturing shortcomings (e.g., maintaining concentricity of the hard protective coating), the high connectivity costs, and the lack of component ecosystems.

SUMMARY

A high-density fiber ribbon interconnect includes an optical fiber ribbon and at least one connector. The optical fiber ribbon includes two or more cladding-strengthened glass optical fibers each having an outer surface and each not individually including a protective polymer coating. A protective polymer coating substantially surrounds the outer surfaces of the two or more cladding-strengthened glass optical fibers so that the protective polymer coating is common to the two or more cladding-strengthened glass optical fibers. A fiber ribbon cable is formed by adding a cover assembly to the fiber ribbon. A fiber ribbon interconnect is formed by adding one or more optical connectors to the fiber ribbon or fiber ribbon cable. Optical data transmission systems that employ the fiber ribbon to optically connect to a photonic device are also disclosed.

Present day optical transceivers used on silicon photonics chips of photonic devices operate at a speed of 100 Gb/s based on 4 lanes at 25 Gb/s per lane. The roadmap for electrical lane speed has been defined for the next generation, and the existing 25 Gb/s lane speed will increase to 56 GBaut/s in the PAM4 signaling protocol which amounts to 112 Gb/s per lane (PAM stands for "pulse amplitude modulation"). The 400 Gb/s Ethernet speed will therefore continue to follow the 4-lane architecture. The optics to support 4 electrical lanes are currently based on either PSM4 (parallel single mode 4 fibers) or the CWDM4 signaling protocol (i.e., 4 wavelength coarse wavelength division multiplexing). The transceiver optical interface is typically an 8 fiber MPO for PSM-4, and a duplex LC for CWDM4.

The pro and cons of the PSM4 versus CWDM4 signaling protocols has been an ongoing debate. The PSM4 transceiver that employs a standard ribbon fiber is currently the lower cost solution, even though the connectivity cost is considerably higher than CWDM4 due to the use of a manual push-on pull-off (MPO) connector. The PSM4 protocol consumes more chip space for coupling to fibers. On the other hand, the CWDM4 transceivers suffer from the excess insertion loss of the WDM multiplexer and de-multiplexer, which typically exceeds 4 decibels (dB). As the transceiver speed increases, the link budget will be challenged to accommodate the high insertion loss of WDM components. Moreover, CWDM transceivers require multiple laser sources and consume more power than PSM4 transceivers. As mega data centers increasingly focus on energy efficiency, parallel single mode remains an appealing solution if the connectivity density can be improved.

The fiber ribbons, cables and assemblies disclosed herein substantially enhance the density of parallel fiber connectivity with photonic devices that include silicon photonics chips (e.g., transceiver chips that support optical waveguides) without resorting to the use of multicore fibers. The conventional approach to improving the fiber density in an optical fiber-based connection has been to reduce the thickness of the protective coating(s) of the optical fibers. A 200 µm diameter fiber, for instance, is designed to reduce the protective coating thickness from 250 µm while using the same glass cladding diameter of 125 µm. The improvement in fiber density has been appreciable for high-fiber-count cables when protective coating thickness is reduced. For transceiver chip coupling, however, the density improvement is incremental at best.

In an example, the high-density fiber ribbons disclosed herein comprise a closely packed array of single-mode fibers in one or more rows, with each fiber having a strengthened cladding and a single common protective coating that directly encapsulates all the fibers, with the exception of the fiber ends as well as the fiber end sections in some examples. Each fiber is made entirely of glass and does not have an individual non-glass protective coating, other than perhaps a thin hermetic seal coating. The lack of individual protective coatings allows for maximizing the fiber density in a fiber ribbon configuration without compromising the optical transmission properties of the fibers.

The fiber cladding is made of silica and includes an inner cladding and an outer cladding. The outer cladding is compositionally distinct from the inner cladding and has higher mechanical strength, greater abrasion resistance, and/or greater fatigue resistance than the inner cladding. The outer cladding is referred to herein as a "strengthened cladding" or a "strengthened outer cladding" and a fiber having the outer cladding is referred to herein as a "cladding-strengthened fiber" or a "cladding-strengthened optical fiber" or a "cladding-strengthened glass optical fiber". The outer cladding is strengthened by doping silica glass. In one aspect, a strengthened outer cladding is made by doping silica glass with titanium dioxide ($TiO_2$). Doping of silica glass to form a strengthened outer cladding improves the scratch and fatigue resistance of the fiber and permits handling and installation of the fiber (e.g. in a ribbon) without damage. The strengthened outer cladding is sufficiently robust to obviate the need for an individual protective coating for each fiber in a ribbon. The overall fiber diameter is accordingly reduced and a higher packing density of fibers in a ribbon is achieved.

The common protective coating can be based on an ultraviolet (UV) curable acrylate, a thermoplastic, or other adhesives. The collectively coated fiber array can include indicia (i.e., features, shapes, markings, etc.) to identify the polarity of the fiber ribbon. The pitch of the fiber array of the fiber ribbon can be transitioned from a relatively high fiber density (e.g., substantially equal to the fiber diameter) at one end to up to 250 µm at the other end. In an example, this can be accomplished using a fan-out structure configured to minimize bending. The different fiber densities can be exploited for mass fusion splicing or termination by MPO ferrules for subsequent termination by an MPO connector. The fiber ribbon can be made compatible to standard 127 µm pitch grooves of a grooved substrate, enabling a simple assembly process for high-density connector assemblies, such as fiber array units (FAUs).

The fiber array can be collectively coated into a relatively small form factor. With a standard outer cladding diameter of 125 µm, the high-density fiber array can utilize existing fiber termination equipment and connectivity components. Higher fiber densities can be achieved by reducing the outer cladding diameter to 80 µm or even lower. Without protective coatings on the individual fibers, the tightly packed fiber array has inherent geometric precision due to the high manufacturing tolerance and consistency of the fiber outer cladding diameter associated with the fiber drawing process.

The present disclosure extends to a fiber ribbon interconnect that includes a fiber ribbon, a first optical connector at a first end of the fiber ribbon and a second optical connector at a second end of the fiber ribbon. The fiber ribbon includes two or more cladding-strengthened glass optical fibers each having an outer surface and a common protective coating that substantially surrounds the outer surfaces of the two or more cladding-strengthened glass optical fibers.

The present disclosure also extends to a fiber ribbon interconnect that includes a fiber ribbon and a first optical connector at a first end of the fiber ribbon. The fiber ribbon includes two or more glass optical fibers each having an outer surface, wherein the two or more glass optical fibers do not include individual protective coatings. The fiber ribbon also includes a common protective coating that surrounds the outer surfaces of the two or more glass optical fibers.

The present disclosure also extends to a fiber ribbon interconnect that includes a high-density optical fiber ribbon having a first end section with a first end, and at least one second end section with at least one second end. The fiber ribbon also includes two or more glass optical fibers arranged in at least one row, with each of the two or more glass optical fibers having an outer surface and not having an individual protective coating. The fiber ribbon also includes a common protective coating that substantially surrounds the outer surfaces of the two or more glass optical fibers. The fiber ribbon interconnect also includes a high-density optical fiber connector connected to the first end of the high-density optical fiber ribbon.

The present disclosure also extends to a method for making a fiber ribbon interconnect. The method includes forming a protective polymer coating surrounding outer surfaces of two or more glass optical fibers, wherein the two or more glass optical fibers do not include individual protective coatings, and wherein the protective polymer coating is common to the two or more glass optical fibers to define an optical fiber ribbon having first and second ends. The method also includes coupling a first optical connector to the first end of the optical fiber ribbon.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 4D is a close-up cross-sectional view of a portion of the fiber ribbon of FIGS. 4A and 4B, illustrating an example where the common protective coating comprises two different materials that define a primary (inner) layer and a secondary (outer) layer.

FIG. 4E is similar to FIG. 4B and shows an example where the common protective coating is thicker on one side of the cladding-strengthened glass optical fibers than the other as an indication of the polarity of the fiber ribbon.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The expression "comprises" as used herein includes the term "consists of" as a special case, so that for example the expression "A comprises B and C" is understood to include the case of "A consists of B and C."

Relative terms like top, bottom, side, horizontal, vertical, etc. are used for convenience and ease of explanation and are not intended to be limiting as to direction or orientation.

The acronym MPO as used herein stands for multifiber push on and is used to describe a type of optical fiber connector known in the art and that is standard in the art.

The term "elastic modulus" as used herein refers to Young's modulus.

The terms "optical fiber" and "glass optical fiber" as used herein refer to a glass fiber configured to operate as a waveguide.

Fiber with Strengthened Cladding

Figure 1:
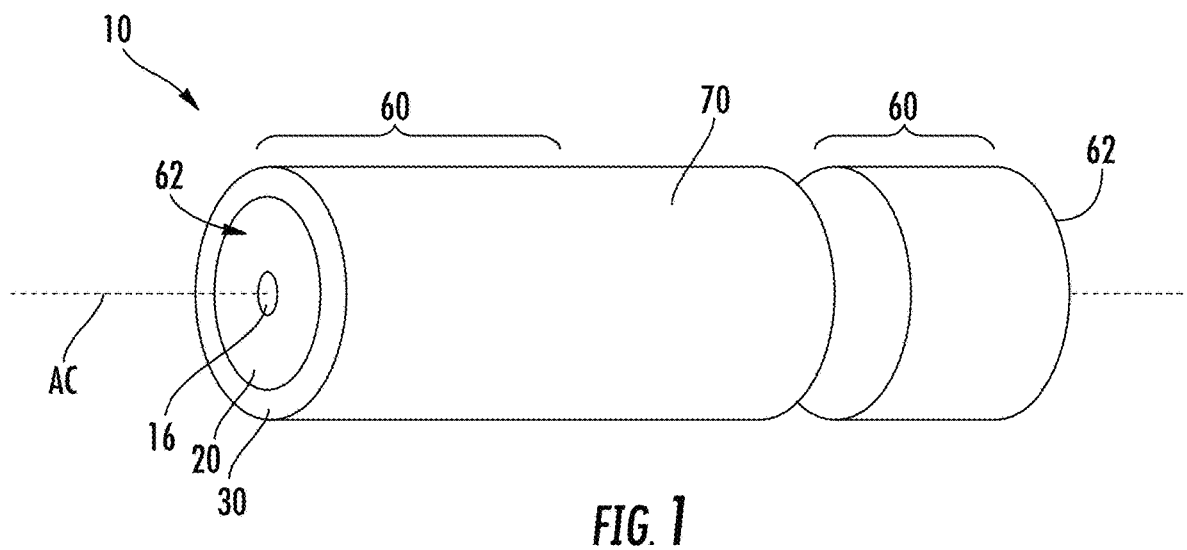
FIG. 1 is a front elevated view of an example cladding-strengthened glass optical fiber as disclosed herein.
Figure 2A:
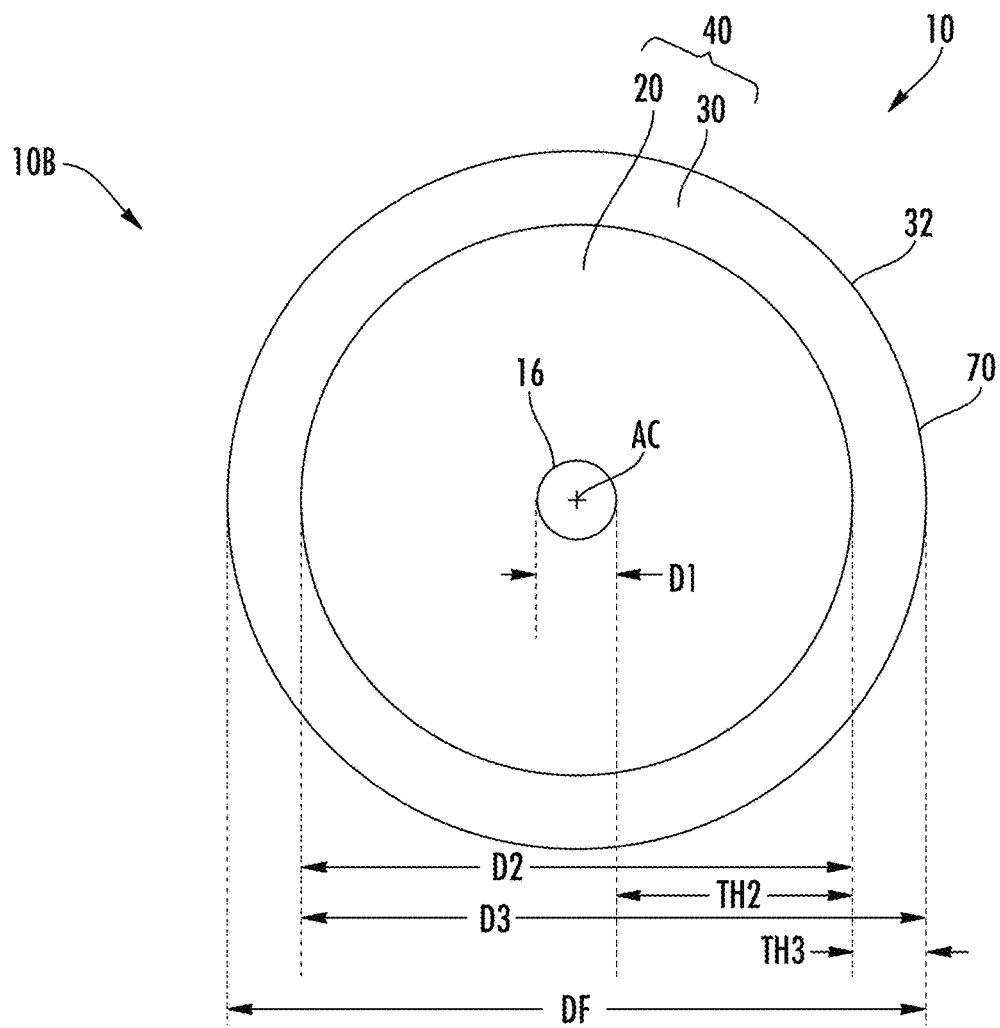
FIG. 2A is a cross-sectional view of the cladding-strengthened glass optical fiber of FIG. 1.

FIG. 1 is a front elevated view of an example cladding-strengthened glass optical fiber ("fiber") 10 as disclosed herein. FIG. 2A is a cross-sectional view of the fiber 10 of FIG. 1. The fiber 10 has a centerline AC, a core 16 centered on the centerline and having a diameter D1, and a cladding 20 surrounding the core and having a diameter D2 and a thickness TH2. The core 16 and cladding 20 are both made of glass and can have the configuration (i.e., refractive index profile, dimensions, etc.) of a conventional optical fiber. The refractive index profile of the fiber 10 can be that for a standard single mode fiber, a bend-insensitive single mode fiber, a few-mode fiber, or a multimode fiber.

An example diameter D1 of the core 16 for a single mode fiber is in the range from about 5 microns to about 10 microns, with about 8 microns being typical value for telecommunications wavelengths of 1310 nm and 1550 nm. An example diameter D2 of the cladding 20 is in the range from about 30 μm to about 250 μm, depending on the desired overall fiber diameter DF, which in an example can be in the range from 50 μm to 200 μm.

The fiber 10 also includes an additional cladding 30 that surrounds the cladding 20, so that the cladding 20 can be considered an inner cladding and the cladding 30 considered an outer cladding of a two-part cladding region 40. The outer cladding 30 has a diameter D3 and a thickness TH3. An example range on the thickness TH3 is between 1 μm and 20 μm.

The outer cladding 30 comprises silica ($SiO_2$) doped with titanium dioxide ($TiO_2$, which is also called "titania"). An example of such a fiber 10 is the Corning® Titan® single-mode optical fiber, available from Corning, Inc., Corning, N.Y. The outer cladding 30 strengthens the fiber 10 and in particular provides abrasion and/or fatigue resistance to the fiber 10. That is, outer cladding 30 has a higher strength parameter S and/or a higher dynamic fatigue parameter nd than inner cladding 20. A fiber with a strengthened outer cladding 30 is referred to herein as a "cladding-strengthened fiber", or a "cladding-strengthened optical fiber", or a "cladding-strengthened glass fiber", or a "cladding-strengthened glass optical fiber". The outer cladding 30 need not be stripped off during splicing or termination. The outer cladding 30 has an outer surface 32, which defines the outer surface of the cladding region 40. The outer surface 32 is a glass surface.

The outer cladding 30 has an amount of compressive stress SC that strengthens the outer surface 32 of the outer cladding layer in a manner similar to chemically strengthened glasses. In an example, the amount of compressive stress SC is in the range from 30 MPa to 100 MPa. In addition, the formation of microcrystals due to doping of the $SiO_2$ with titania can stop defects such as scratches from propagating through the fiber 10, resulting in further fatigue resistance. In an example, the doping concentration of titania in the $SiO_2$ of the outer cladding 30 is in the range from 5 wt % to 25 wt %. The outer cladding 30 contributes to the overall refractive index profile of the fiber 10, but is also designed to avoid excess loss of the guided light from the core 16. Because the titania dopant in silica glass increases the refractive index, it can cause tunneling loss of guided light traveling in the core 16 to the titania doped outer cladding 30. To avoid this excess loss, the starting position (inner radius) of outer cladding 30 needs to be sufficiently away from the core. Preferably, the spacing (radial distance) between the core 16 and the outer cladding 30 (i.e., the thickness TH2 of the inner cladding 20 as shown in FIG. 2A) is greater than 25 μm and more preferably greater than 30 μm.

Figure 2B:
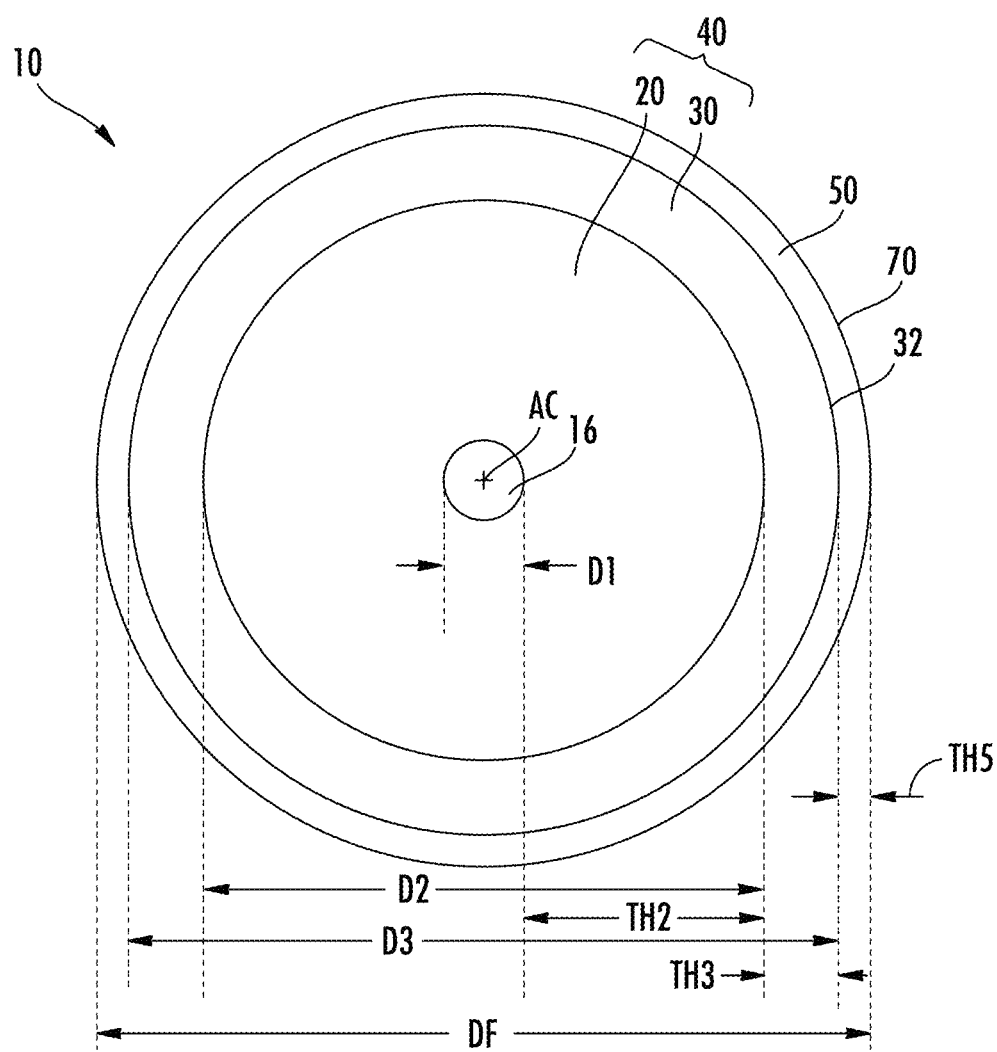
FIG. 2B is similar to FIG. 2A, but shows an embodiment of the cladding-strengthened glass optical fiber that includes a hermetic sealing layer.

The fiber 10 also has an outer surface 70. In the example of FIG. 2A, fiber 10 is bare fiber 10B and outer surface 70 is the same as the outer surface 32 of the outer cladding 30. FIG. 2B is similar to FIG. 2A and illustrates an example sealed fiber 10H that includes a hermetic sealing layer 50 on the outer surface 32 of the outer cladding 30. In an example, the hermetic sealing layer 50 comprises or consists essentially of carbon. In one example, the hermetic sealing layer 50 has a thickness TH5<100 nm and so does not contribute substantially to the overall size (diameter DF) of the sealed fiber 10H. In an example, the hermetic sealing layer is made of an inorganic material, e.g., is not made of an organic polymer such as acrylate. The hermetic sealing layer 50 is designed to prevent moisture and other adverse materials in the environment from entering and possibly damaging the fiber. The hermetic sealing layer 50 is thus substantially different in chemical composition from a protective coating used on conventional individual optical fibers or the common protective coating for fibers in an array or bundle. Protective coatings for individual optical fibers and fiber arrays or bundles are organic polymers. The organic polymers are formed by polymerizing organic monomers, usually acrylate or methacrylate monomers. Thermoplastic organic polymers are also used as protective coatings for individual optical fibers and fiber arrays or bundles. The hermetic sealing layer 50 is not an organic polymer and has a thickness well below the thickness used for the protective coatings of individual optical fibers or fiber arrays or bundles. In an example discussed below, the hermetic sealing layer comprises a self-assembled monolayer (SAM), such as formed using a silane compound. Example hermetic sealing layers 50 are discussed in greater detail below. In the discussions below, the fiber 10 can be a fiber such as sealed fiber 10H in FIG. 2B or a bare fiber 10B such as in FIG. 2A, unless the particular type of fiber is specified.

A given length of fiber 10 has opposite end sections 60 each with an end face 62, as shown in FIG. 1. The fiber 10 has the aforementioned outer surface 70, which can be defined by the cladding region 40 as in bare fiber 10B of FIG. 2A or the hermetic sealing layer 50 as in sealed fiber 10H of FIG. 2B, depending on the configuration of the fiber.

In the discussion and in the drawings, reference to fiber 10 refers to either bare fiber 10B or the sealed fiber 10H, unless otherwise noted.

Fabricating the Fiber

Figure 3A:
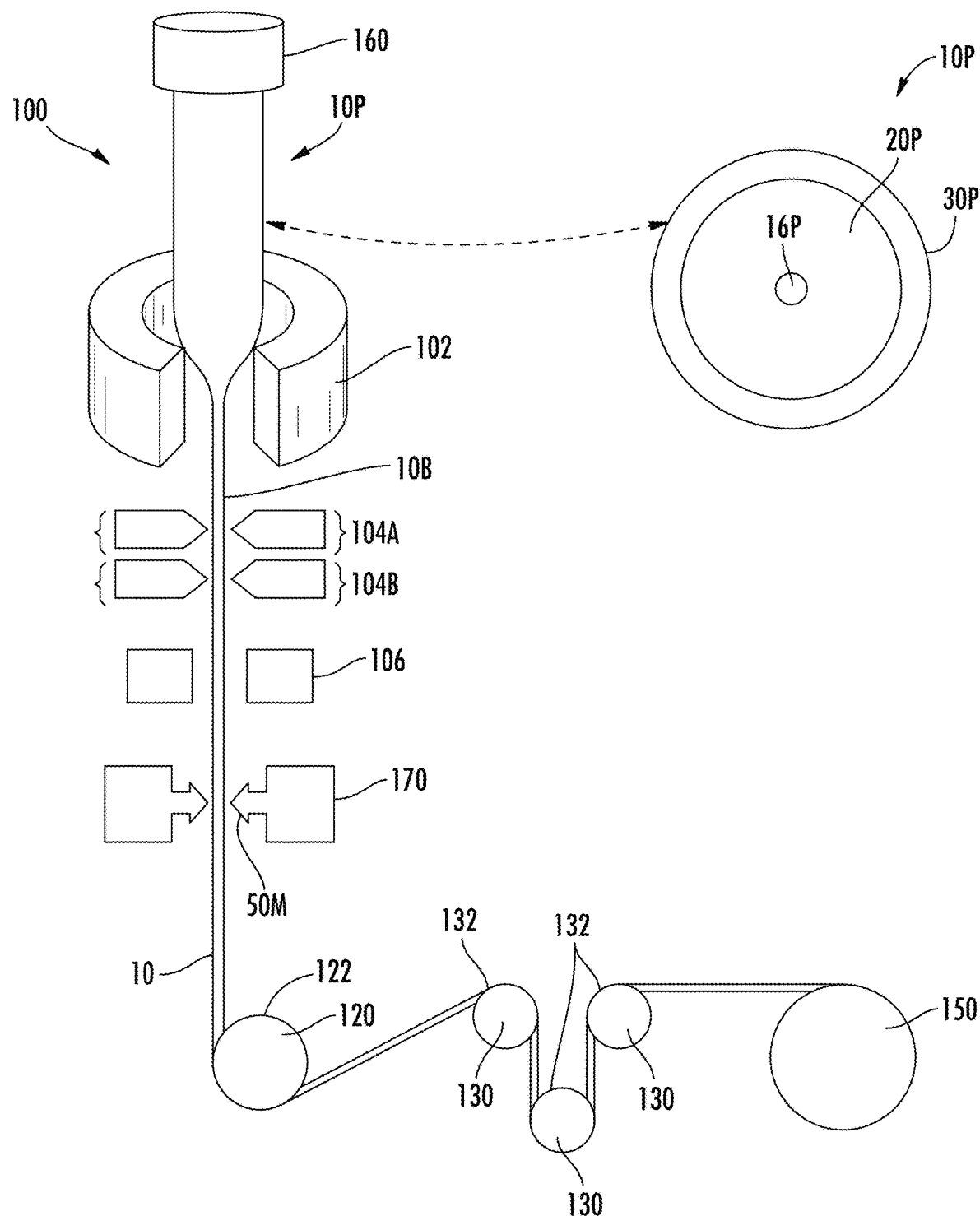
FIG. 3A is a schematic diagram of an optical fiber drawing system used to form the cladding-strengthened glass optical fibers disclosed herein.

The fiber 10 can be made by drawing a fiber from a preform using standard optical fiber fabrication drawing techniques. FIG. 3A is a schematic diagram of an example optical fiber drawing system ("drawing system") 100. The drawing system 100 may comprise a draw furnace 102 for heating the preform to the glass melt temperature, non-contact measurement sensors 104A and 104B for measuring the size of the drawn fiber as it exits the draw furnace for size (diameter) control, a cooling station 106 to cool the drawn fiber, a tensioner 120 with a surface 122 to pull (draw) the fiber, guide wheels 130 with respective surfaces 132 to guide the drawn fiber, and a fiber take-up spool ("spool") 150 to store the drawn fiber.

The drawing system 100 also includes a preform holder 160 located adjacent the top side of the draw furnace 102 and that holds a glass preform 10P used to form the fiber 10. With reference to the close-up inset of FIG. 3A that shows a cross-sectional view of the glass preform 10P, the preform has a preform core 16P, an inner preform cladding 20P and a outer preform cladding 30P. The glass preform 10P has generally the same relative configuration and dimensional proportions in the radial direction as bare fiber 10B but is much larger, e.g., 25X to 100X larger.

The preform core 16P can be made by doping silica with an index-increasing dopant such germanium oxide. The inner preform cladding 20P and outer preform cladding 30P start out as pure silica ($SiO_2$). The preform outer cladding 30P is then doped with titania to strengthen it. The glass preform 10P and in particular preform core 16P and the inner preform and outer preform cladding layers 20P and 30P may be produced in a single-step process or multi-step process. Suitable methods or processes include: the double crucible method, rod-in-tube procedures, and doped deposited silica processes, also commonly referred to as chemical vapor deposition (CVD). A variety of CVD processes are known and are suitable for producing the core and cladding layers used in the optical fibers of the present invention. They include outside vapor deposition process (OVD) process, vapor axial deposition (VAD) process, modified CVD (MCVD), and plasma-enhanced CVD (PECVD).

After the glass preform 10P is formed, it is operably supported in the preform holder 160 relative to the draw furnace as shown in FIG. 3A. The glass preform 10P is then heated by the draw furnace 102 and drawn into fiber 10 using the drawing system 100. The drawing process is similar to a conventional fiber draw process, except that no polymer coatings are added to the fiber 10, i.e. the fiber is a bare glass fiber 10B with a strengthened outer cladding 30 or a sealed glass fiber 10H with a strengthened outer cladding 30 and a hermetic sealing layer 50 as discussed above. Note in particular that the doped outer preform cladding 30P defines the chemically strengthened (doped) outer cladding 30 when the preform 10P is drawn to form the fiber 10.

In the fabrication process, the fiber drawn from glass preform 10P exits the draw furnace 102, with tension applied by the tensioner 120. The dimensions (e.g., the diameter) of the fiber are measured by the non-contact sensors 104A and 104B and the measured dimensions are used to control the draw process. The fiber can then pass through the cooling mechanism 106, which can be filled with a gas that facilitates cooling at a rate slower than air at ambient temperatures. At this point, the fiber 10 is a bare fiber 10B.

The fiber 10 passes from the tensioner 120 to the guide wheels 130, then through the guide wheels to the spool 150, where the fiber 10 is taken up and stored. It is noted that a bare glass fiber without a protective coating that lacks outer cladding 30 cannot be collected on a take-up spool as a practical matter due to the high break rate due to surface damage to the fiber. The strengthened outer cladding 30 of fiber 10 makes possible collecting this glass fiber on the spool 150 without breaks. Also, in an example, the tensioner surface 122 and the guide wheel surfaces 132 preferably comprise either a polymer material such as a fluoropolymer (e.g., polytetrafluoroethylene or PTFE), or a plastic material or a rubber material, to protect the fiber 10 from surface damage.

The configuration of the glass preform 10P and the various drawing parameters (draw speed, temperature, tension, cooling rate, etc.) dictate the final form of the fiber 10.

Embodiments of the Hermetic Sealing Layer

In the example sealed fiber 10H of FIG. 2B that includes the hermetic sealing layer 50 (i.e., the coated fiber), the drawing system 100 can include an applicator device 170 that applies a hermetic sealing layer material 50M to the drawn bare fiber 10B as the bare fiber 10B passes by the applicator device 170. The applicator device 170 can also be one that is off-line, i.e., in another location besides in the drawing system 100 and employed after the bare fiber 10B is collected on the spool 150, with the fiber distributed from the spool for application of the hermetic sealing layer material 50M to bare fiber 10B by the applicator device 170 for form hermetic sealing layer 50.

In an example, the hermetic sealing layer material 50M comprises an inorganic material, such as an inorganic hydrophobic material. Hermetic sealing layer materials that include silicon are regarded herein as inorganic materials even if carbon or an organic fragment is bonded to silicon. Organosilanes, for example, are regarded as inorganic materials for purposes of the present disclosure.

In another example, the hermetic sealing layer material 50M comprises a self-assembled monolayer (SAM). In an example, the SAM is formed using a silane, preferably an organosilane, which can be applied in liquid form onto the bare fiber 10B using the applicator device 170. The SAM hermetic sealing layer material 50M that defines an example hermetic sealing layer 50 produces a hydrophobic outer surface 70 for the sealed fiber 10H that shields the outer cladding 30 from moisture, thereby slowing down the development of glass fatigue and reduce fiber breaks. Because the SAM layer is thin (e.g., <10 nm), it does not need to be removed when making the fiber ribbon (introduced and discussed below), and does not affect fiber positioning (e.g., the fiber ribbon pitch). In some embodiments, the SAM layer covers or is uniformly distributed over the entirety of the outer surface 32 of the outer cladding 30. In other embodiments, the SAM layer does not cover or is not uniformly distributed over the entirety of the outer surface 32 of the outer cladding 30. For example, gaps may exist in the SAM layer and portions of the outer surface 32 of the outer cladding 30 may be exposed.

One example of a silane in liquid form comprises octadecyldimethyl trimethoxysilylpropyl ammonium chloride (60 wt % in MeOH), acetic acid (0.05 wt %) and deionized water (18 Mohm, 0.2 micron filtered). In an example, the proportions by weight of the three ingredients can be 16.7:1:19823.4. The deposited layer of the silane liquid as the hermetic sealing layer material 50M produces on the outer surface 32 of the outer cladding 30 a hermetic sealing layer 50 with a hydrophobic fiber outer surface 70 that can inhibit moisture from getting into the glass material of the fiber.

Figure 3B:
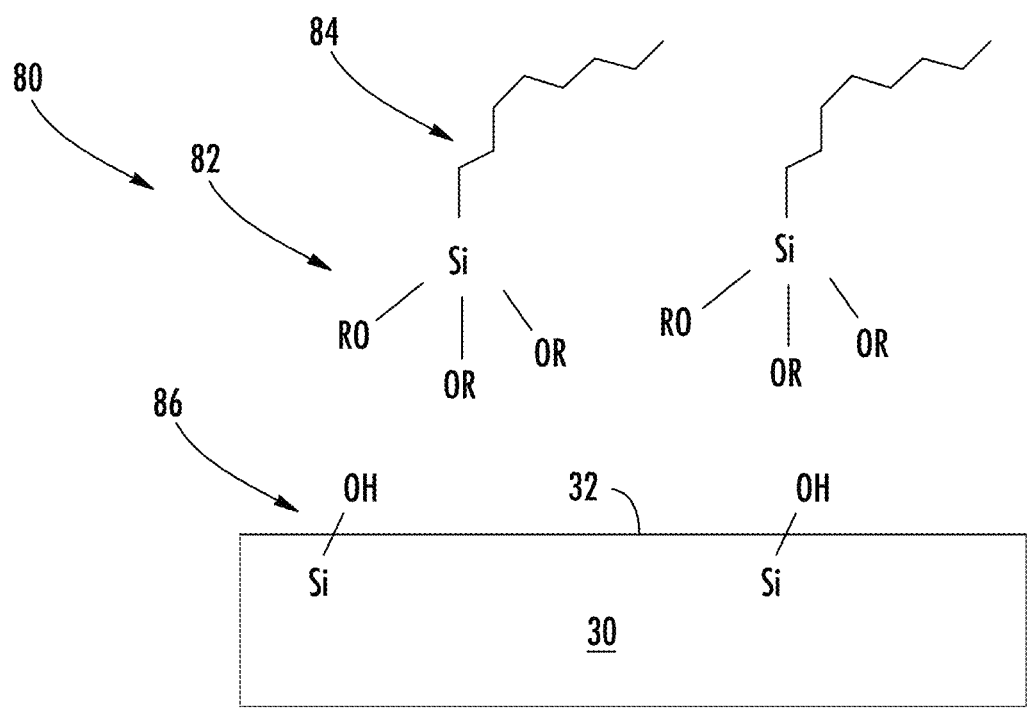
FIGS. 3B and 3C are close-up views of the glass outer surface of the cladding-strengthened glass optical fiber and illustrate how the outer surface can be readily functionalized using a fluourinated silane.
Figure 3C:
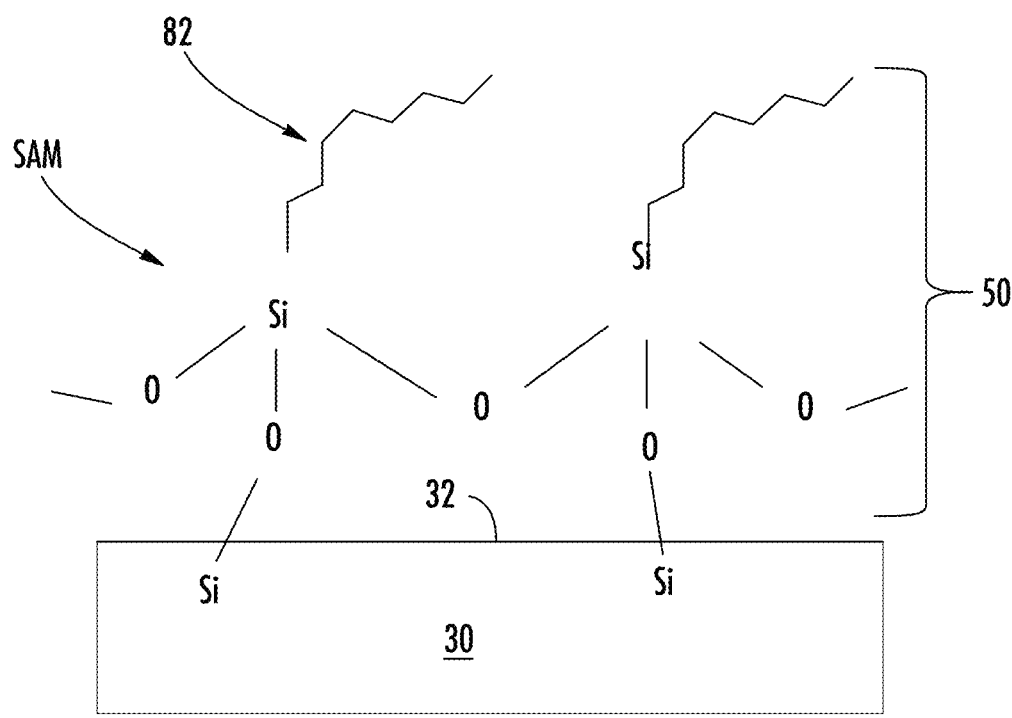

FIGS. 3B and 3C are close-up views of the outer surface 32 of the sealed fiber 10H and illustrate how the outer surface can be functionalized using a fluourinated silane 80 as hermetic sealing material 50M. The fluorinated silane 80 includes a silane core 82 and fluorinated chain 84 attached thereto. The fluorinated silane 80 can be can be introduced to the outer surface 32 (FIG. 3B) so that the silane core 82 bonds to silanol groups 86 on the outer surface 32, thereby forming the thin silane-based SAM hermetic sealing layer 50 (FIG. 3C).

In an example, a solution of perfluoropolyether-functionalized silane 80 was used as the hermetic sealing layer material 50M to create a hydrophobic hermetic sealing layer 50. The silane-based hermetic sealing layer material 50M was prepared as a solution by adding 0.12 vol % perfluoropolyether-functionalized silane to a fluorinated solvent. A silane-based hermetic sealing layer material 50M can be applied to the bare fiber 10B by using an applicator device 170 that includes a die containing the liquid hermetic sealing layer material 50M. After passing through the die, a thin layer of the hermetic sealing layer material 50M is coated on the outer surface 32. Some hermetic sealing layer materials 50M can be dried in air at the ambient temperature. Some hermetic sealing layer materials 50M require curing. The curing can be done by heating for heat-curable materials or by UV light for UV-curable materials.

In another example, the hermetic sealing layer material 50M comprises carbon to define a carbon-based hermetic sealing layer 50. The carbon can be deposited on the outer surface 32 of the outer cladding 30 by the applicator device 170 in the form of an atmospheric chemical vapor deposition chamber in which a hydrocarbon gas, such as methane, acetylene, ethylene, propane, etc. undergoes pyrolysis and a heterogeneous reaction on the outer surface 32. Carbon is strongly bonded to silica with Si—C bond. The carbon layer has typically a randomly oriented graphite platelet structure or amorphous cross-linked graphite structure. Forms of carbon with graphite structures are regarded herein as inorganic materials.

The wettability of example sealed fibers 10H with the hermetic sealing layer 50 was evaluated by using dynamic contact angle measurement using a tensiometer (K100C-MK2, Kruss GmbH, Germany). The contact angle θ is a quantitative measure of wettability of the outer surface 70 of the fiber 10H by a liquid. Generally, if the contact angle θ is less than 90° the surface is said to be hydrophilic. On the other hand, if the contact angle θ is greater than 90°, the surface is said to be hydrophobic.

Figure 3D:
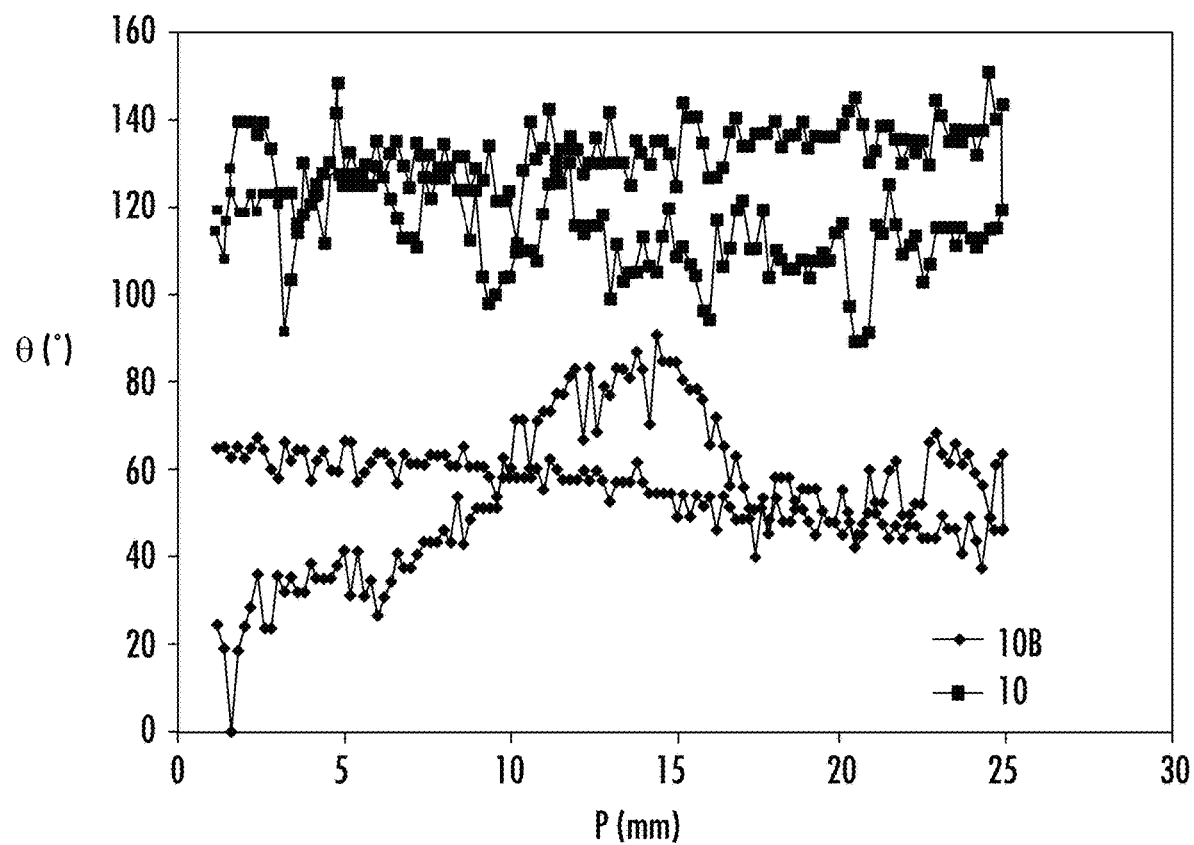
FIG. 3D is a plot of the contact angle θ (°) versus measurement position P (mm) for a bare fiber (10B) and for a fiber (10) having a silane-based hermetic sealing layer.

FIG. 3D is a plot of the contact angle θ (°) versus measurement position P (mm) for a bare fiber 10B (i.e., no hermetic sealing layer 50; see FIG. 2A) and for a sealed fiber 10H (see FIG. 2B) having a silane-based hermetic sealing layer 50 as described above. The plot includes the advancing contact angle measured as the sample fiber 10 is immersed in the liquid (+P direction) and the receding contact angle measured as the sample fiber emerges from liquid (−P direction). Table 1 below lists the advancing, receding and the contact angle hysteresis (difference between the advancing and receding contact angle). The contact angle hysteresis is a measure of surface heterogeneity and surface roughness.

TABLE 1

| | Water contact angle θ (°) | | |
|---|---|---|---|
| Sample | Advancing | Receding | Hysteresis |
| Bare fiber | 29.3 ± 18.2 | 63.0 ± 7.0 | 33.7 ± 25.2 |
| Coated fiber | 131.4 ± 5.0 | 114.9 ± 5.6 | 16.6 ± 10.6 |
| Control (flat glass) | 118.4 ± 0.3 | 95.8 ± 3.1 | 22.6 ± 3.3 |

Contact angles θ of the bare fibers 10B were in the range of 29-63° indicating the hydrophilic nature of the bare fibers 10B. In contrast, contact angles θ measured on the sealed fiber 10H were in the range of 115-131°, indicating that the hermetic sealing layer 50 is hydrophobic. In addition, the contact angle hysteresis of the sealed fibers 10H is lower than that for the bare fibers 10B, suggesting good uniformity of the hermetic sealing layer 50 on the outer surface 70.

In the case of a silane-based hermetic sealing layer 50, the thickness TH5 of this layer need not exceed 10 nm. The thickness of a hermetic sealing layer 50 made in the form of a SAM from a silane-based hermetic sealing material 50m is less than or equal to 10 nm, or less than or equal to 8 nm, or less than or equal to 6 nm, or in the range from 3 nm-10 nm, or in the range from 4 nm-8 nm. These ranges for the thickness TH5 are suitable if the main purpose of the hermetic sealing layer 50 is to provide hydrophobicity. In other embodiments, the hermetic sealing layer 50 is also used to improve the mechanical properties of the fiber and the thickness TH5 of the hermetic sealing layer 50 is preferably greater than 10 nm. In an example, the hermetic sealing layer material 50 can comprise a fluorosilicone and/or a perfluoroelastomer and the layer thickness TH5 can be in the range from 10 nm-10 microns, or in the range from 50 nm-5 microns, or in the range from 100 nm-3 microns. One example of the fluorosilicone comprises a polysiloxane backbone with a fluorinated pendant groups (e.g. trifluoropropyl groups). Such fluorosilicones can be moisture cured or catalyst-cured (e.g. platinum-cured) with a hydride cross-linker at room temperature and the cure can be accelerated by applying heat. The fluorosilicones, in addition to providing hydrophobicity, can also provide shock and vibration absorption and increased durability, thereby increasing the mechanical properties of the fibers.

In another example, the hermetic sealing layer material 50M comprises a perfluoroelastomer (FKM). A type of FKM suitable for use as the hermetic sealing layer material 50M is known as VITON®, which is a registered trademark of The Chemours Company of Wilmington, Del. In an example, the FKM can be cured by peroxide and can also be grafted with silicones using amino-functionalized polydimethyl siloxane. These silicone-grafted FKMs can provide the flexibility of the silicones along with the durability and tensile strength of the FKMs.

Fiber Ribbon

Figure 4A:
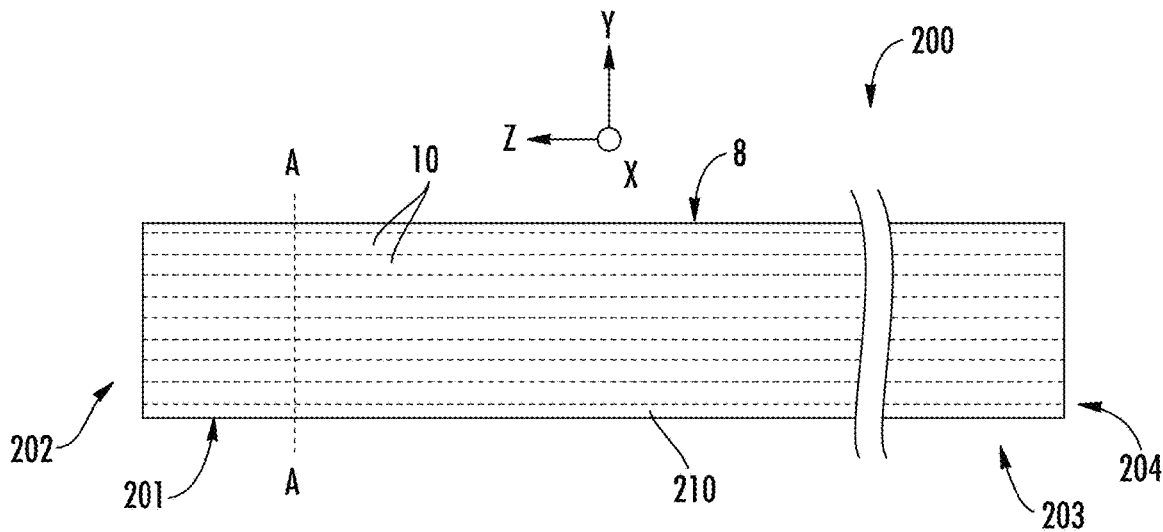
FIG. 4A is a top-down view of an example fiber ribbon that employs the cladding-strengthened glass optical fibers embedded in a common protective coating.
Figure 4B:
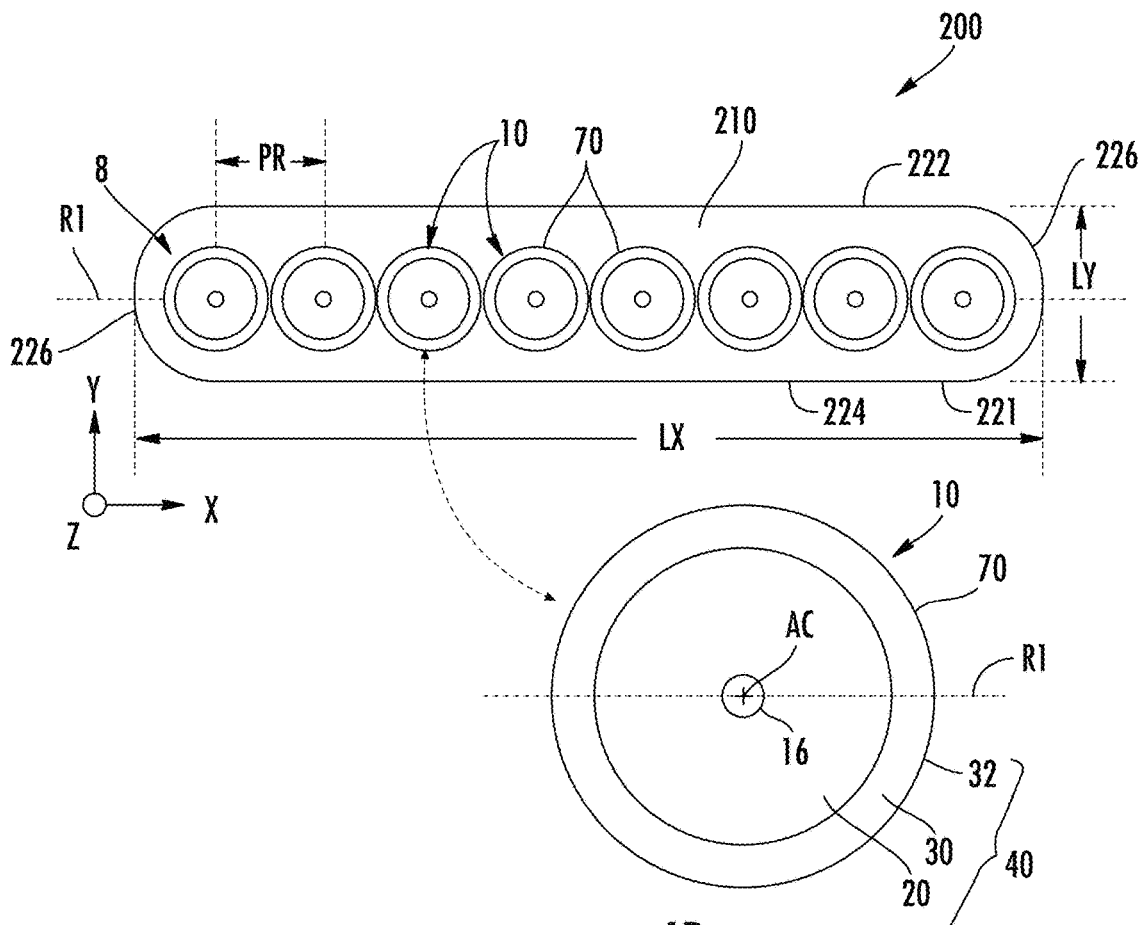
FIG. 4B is a cross-sectional view of the fiber ribbon of FIG. 4A.

FIG. 4A is a top-down view of an example optical fiber ribbon ("fiber ribbon") 200 that employs an array 8 of the fibers 10 disclosed herein. FIG. 4B is an x-y cross-sectional view of the example fiber ribbon 200 as taken along the line A-A in FIG. 4A. The example fiber ribbon 200 of FIG. 4A has a substantially constant x-y cross-sectional shape in the z-direction. The array 8 of fibers 10 are arranged in a row i.e., with their centerlines AC substantially residing on reference line R1 that runs in the x-direction (see the close-up inset of FIG. 4B). The fiber ribbon 200 has a first end section 201 with a first end 202 and a second end section 203 with a second end 204.

While the fiber ribbon 200 can generally comprise two or more fibers 10 in the fiber array 8, in some preferred embodiments, the fiber ribbon 200 comprises multiples of 8 fibers, e.g., 8, 16, 24, etc. In addition, while the fiber ribbon 200 described in detail below includes cladding-strengthened optical fibers 10, in other embodiments the fiber ribbon 200 may include other types of glass or plastic optical fibers.

The cladding-strengthened optical fibers 10 reside within a common protective coating 210, i.e., the common protective coating 210 generally surrounds the outer surfaces 70 of the fibers 10. The cross-sectional view of FIG. 4B shows the fibers 10 encapsulated within the common protective coating 210. In some examples, one or both end sections 60 of one or more of the fibers 10 are exposed, as explained below. The common protective coating 210 has an outer surface 221 with a top side 222, a bottom side 224 and edges 226. In an example, the common protective coating 210 has an oval, rectangular (with sharp or rounded corners), or similar elongate shape, with a long dimension LX in the x-direction and a short dimension LY in the y-direction. Note that in an embodiment where the outer surfaces 70 of the fibers 10 are in contact with each other to maximize the fiber density, the common protective coating 210 may not be contact the entire outer surface 70 of each fiber 10 at the location where adjacent fibers are in contact. In other embodiments where the fibers 10 are spaced apart from each other, the common protective coating 210 surrounds the entire outer surface 70 of each fiber over at least a portion of the length of the fiber ribbon 200.

As discussed above, typical optical fibers, in an array or individually, each have an individual protective coating. In contrast, the fibers 10 in array 8 do not each include individual protective coatings. Instead, the common protective coating 210 is common to fibers 10 in array 8 of fiber ribbon 200. As used herein, a coating is said to be "common" if it is applied to a plurality of fibers 10 of an array 8 and if it makes direct contact with an outer surface 70 of at least some of the plurality of fibers 10 of the array 8. In some embodiments, for example, the common protective coating directly contacts the outer surface of two or more of the cladding-strengthened glass optical fibers. The common protective coating 210 may be applied simultaneously to the plurality of fibers 10 of the array 8. If the plurality of fibers 10 includes two or more bare fibers 10B, a coating is common if it makes direct contact with outer surface 32 of at least two of the fibers in the plurality. If the plurality of fibers includes two or more hermetic sealed fibers 10H, a coating is common if it makes direct contact with outer surface 70 of at least two of the fibers in the plurality.

In an example, the common protective coating 210 is made of a non-glass material, and further in the example is made of a polymer such as those used as protective primary or secondary coatings for individual optical fibers. The polymer is preferably an organic polymer. Such polymers include acrylates, methacrylates, and polyamides. Other non-glass materials known in the art for coating glass optical fibers can also be used for the common protective coating 210, including thermoplastics and adhesives. In an example, the material used for the common protective coating 210 is curable by exposure to ultraviolet (UV) light (i.e., is UV curable). An example thermoplastic has a melt temperature in the range of 160° C. to 260° C., a melt viscosity in the range of 100 centipoise (cP) to 10,000 cP, and an operating temperature from −40° C. to 100° C., noting that telecommunications standards involve testing telecommunications components (including fibers) over a temperature range from −40° C. to 85° C.

In an experiment, an example fiber 10 having an outer cladding 30 with a thickness of 2 μm was formed using the above-described drawing process using the drawing system 100 and wound around the take-up spool 150. Then eight fibers 10 were bundled together to form a fiber array 8. The fiber array 8 was then coated using a thermoplastic split die coating drawing process to form a common protective coating 210 around the eight fibers 10. The polymer used to form the common protective coating 210 was polyamide (Henkel PA652, also known as MACROMELT OM 652, available from Henkel Corporation, Rocky Hill, Conn.), which was heated to 190° C. as the fiber array 8 passed through. The polyamide coating solidified when cooled down to less than 120° C. to form the (solid) common protective coating 210. With reference to FIG. 4B, the resulting fiber ribbon 200 had a dimension LY in the y-direction 0.21 mm and a dimension LX in the x-direction of 1.1 mm. The fiber ribbon 200 was measured for bending loss and exhibiting the preferential bending properties as expected.

Figure 4C:
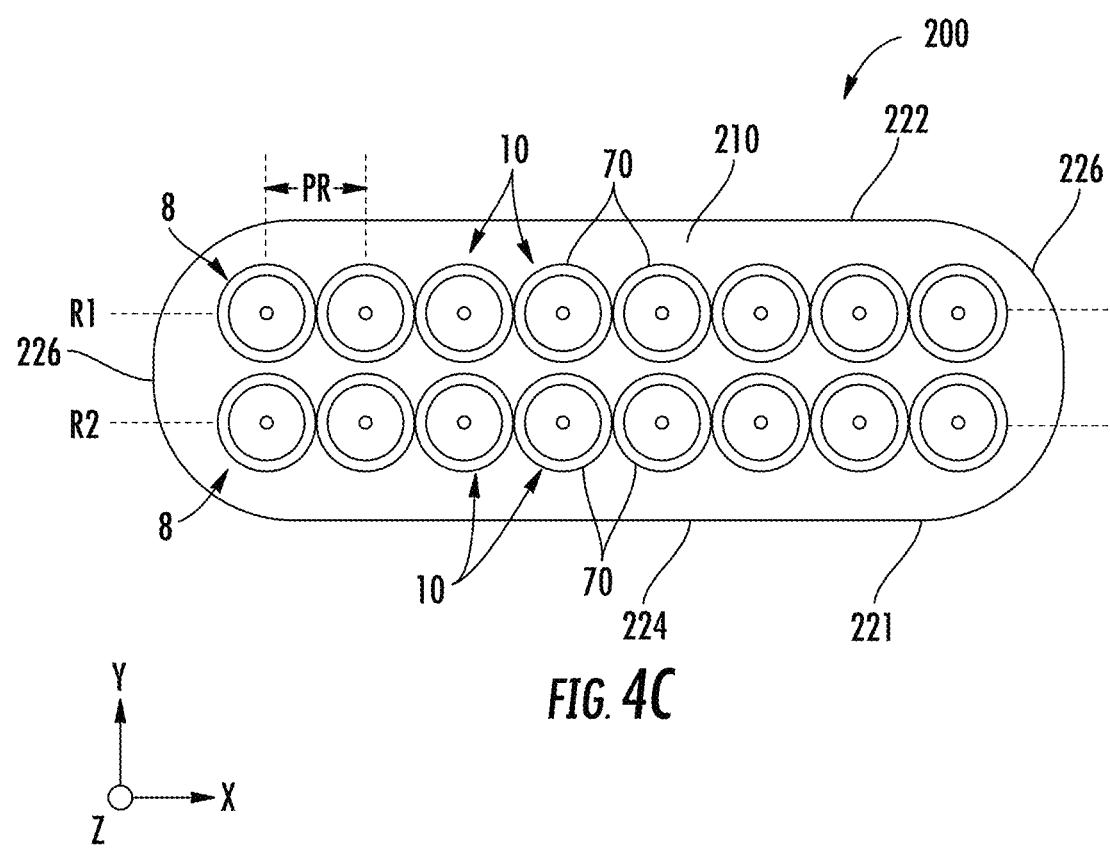
FIG. 4C is similar to FIG. 4B and shows two rows of the cladding-strengthened glass optical fibers within the common protective coating.

FIG. 4C is similar to FIG. 4B and shows an example embodiment wherein the fibers 10 are arranged in two arrays 8 in the form of rows defined by respective reference lines R1 and R2 that run in the x-direction. More than two rows of fibers 10 can also be implemented, and the discussion below focuses on a single-row embodiment of the fiber ribbon 200 for ease of illustration and explanation.

The fibers 10 define a fiber pitch PR for the fiber ribbon 200, which defines the fiber density for the fiber ribbon i.e., the number of fibers per unit length along the given row of fibers. As discussed below, the fiber pitch PR for the fiber ribbon 200 can be constant with length along the fiber ribbon, or can change, depending on the particular fiber ribbon configuration. The fiber pitch PR can be in the range from the fiber diameter DF to 250 microns, wherein the greatest fiber density is about 2× of the greatest fiber density of a conventional fiber ribbon. This factor increases to 4× for two-dimensional arrays 8 (i.e., two rows) of fibers 10.

In one embodiment, fiber density is expressed as the separation between adjacent glass optical fibers in a fiber ribbon. Each of the fibers in a ribbon has a centerline and fiber density is expressed in terms of the separation between centerlines of adjacent glass optical fibers in the fiber ribbon. The separation of centerlines of adjacent glass optical fibers is less than 150 microns, or less than 125 microns, or less than 100 microns, or less than 80 microns, or less than 60 microns, or in the range from 40 microns-150 microns, or in the range from 60 microns-125 microns, or in the range from 75 microns-110 microns.

The fiber density of the fiber ribbon 200 is greater than that of a conventional fiber ribbon mainly because conventional optical fibers include individual protective coatings applied during the fiber drawing process. Such protective coatings typically have an outer diameter of about 240 microns, which approximately doubles the diameter of the fiber relative to the cladding-strengthened fibers disclosed herein. Without the protective coating, a conventional optical fiber has very high chance of breaking when wound onto the take-up spool because a conventional optical fiber lacks a strengthened outer cladding 32 as described herein, which makes the ribbon fabrication process with high fiber density as disclosed herein impractical to implement. The local stress imparted to a bare glass conventional fiber also present long-term reliability risks that are mitigated through inclusion of the strengthened outer cladding 32.

In one example, the common protective coating 210 is made of a single polymer material. In another example illustrated in the close-up cross-sectional view of FIG. 4D, the common protective coating 210 includes multiple polymer materials, which in one aspect are layered to define a primary (inner) layer 212 and a secondary (outer) layer 214 in the case of two different polymer materials. In an example, the secondary layer 214 has a higher elastic modulus than the primary layer 212, with the elastic modulus of the entire common protective coating 210 being an effective elastic modulus that is substantially an average of the respective elastic moduli of the primary and secondary layers. This configuration provides a relatively soft, cushioning layer closest to the fibers 10 that protects the fibers from mechanical loads while also providing a harder, abrasion-resistant layer on the outermost surface 221 of the fiber ribbon. An example of a dual-layer common protective coating 210 that can be effectively utilized to form the fiber ribbon 200 is the Corning® CPC® protective coating, available from Corning, Inc., Corning, N.Y. In an example, the effective elastic modulus of a protective coating with one or a plurality of layers is in the range from 10 MPa-1000 MPa, or in the range from 20 MPa-800 MPa, or in the range from 50 MPa-600 MPa.

The common protective coating 210 may be deposited over the fibers 10 using techniques known in the art such as by disposing a curable coating composition on the fibers 10 and then curing the curable coating composition using, for example, ultraviolet (UV) light, heat, or by other means known in the art. In this embodiment, the common protective coating 210 is a cured product of the curable coating composition.

The fiber ribbon 200 may optionally include indicia 230, such as geometrical features, markings, colorings, etc. to identify the polarity of the fiber ribbon. For instance, with reference to FIG. 4E, the common protective coating 210 may be made asymmetric relative to the reference line R1, e.g., the thickness of the common protective coating 210 may be different between the reference line R1 and the top surface 222 as compared to the thickness between the reference line R1 and the bottom surface 224. In other example, the top/bottom sides or left/right sides of the common protective coating 210 can be formed by polymers having different colors.

Fiber Ribbon Cable

Figure 5A:
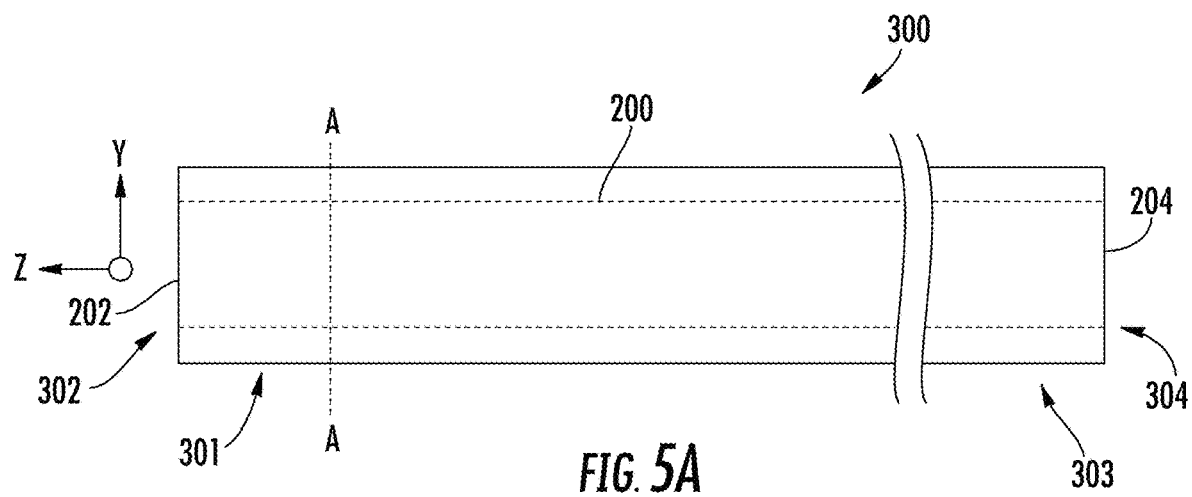
FIG. 5A is a top down view of an example fiber ribbon cable formed using the fiber ribbon.

FIG. 5A is a top-down view similar to FIG. 4A and shows an example of a fiber ribbon cable 300 formed using the fiber ribbon 200. The fiber ribbon cable 300 has first and second end sections 301 and 303 that respectively include first and second ends 302 and 304. The first and second ends 202 and 204 of the fiber ribbon are shown as coinciding with the first and second ends 302 and 304 of the fiber ribbon cable, but this need not be the case.

Figure 5B:
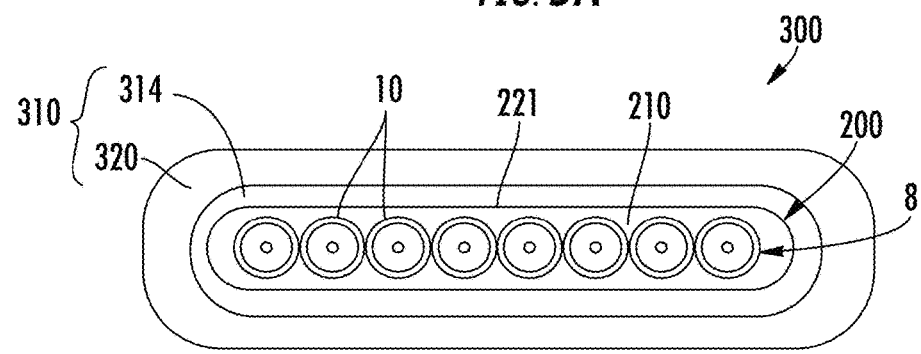
FIGS. 5B through 5D are cross-sectional views of the fiber ribbon cable of FIG. 5A, wherein the fiber ribbon cable comprises the fiber ribbon and a cover assembly that surrounds the outside of the fiber ribbon.
Figure 5C:
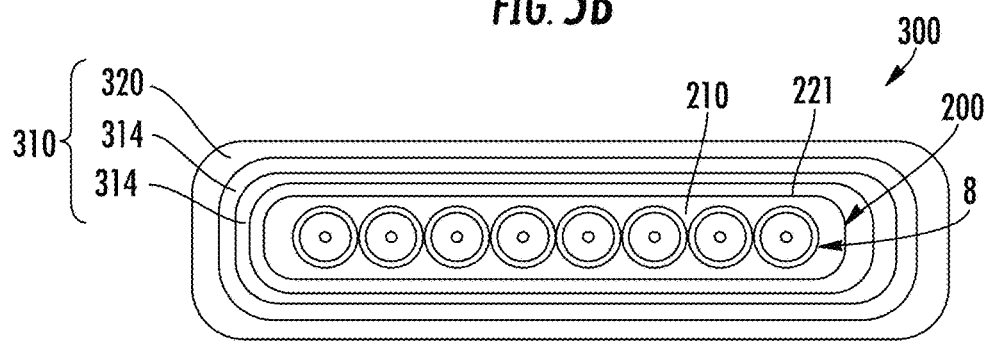
Figure 5D:
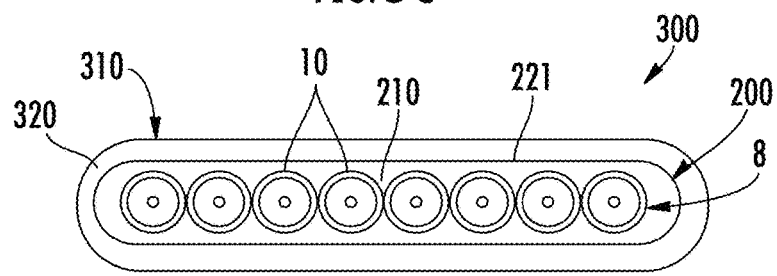

FIGS. 5B through 5D are cross-sectional views of examples of the fiber ribbon cable 300 of FIG. 5A. The fiber ribbon cable 300 includes the fiber ribbon 200 and a cover assembly 310 that surrounds the outer surface 221 of the common protective coating 210 of the fiber ribbon. In an example, one or more fiber ribbons 200 can be loosely arranged within the cover assembly 310, i.e., the fiber ribbon cable 300 can be a loose-buffered cable. In another embodiment, the fiber ribbon cable 300 can be a tight-buffered cable.

In the example cover assembly 310 of the fiber ribbon cable of FIG. 5B, the fiber ribbon 200 is surrounded by a strength layer 314 (e.g., aramid yarn), and an outer jacket 320 that surrounds the strength layer. The example configuration of FIG. 5C comprises a binder layer 312 that surrounds the fiber ribbon 200, with the strength layer 314 surrounding the binder layer 312 and the outer jacket 320 surrounding the strength layer.

FIG. 5D shows an example where the outer jacket 320 is provided directly to the outer surface 221 of the common protective coating 210 of the fiber ribbon 200.

Various other configurations for the cover assembly 310 as known in the art can also be effectively employed. For example, multiple fiber ribbons 200 can supported within the cover assembly 310.

Fiber Ribbon Interconnect

The fiber ribbon 200 is compatible with existing fiber processing tools and termination components. In one example, a fiber ribbon interconnect is formed by terminating the first and second ends of the fiber ribbon 200 with respective optical fiber connectors ("connectors"). In another example, the fiber ribbon interconnect is formed by connectorizing the fiber ribbon at only one end. In another example, a fiber ribbon interconnect includes the cover assembly that forms a fiber ribbon cable 300. Most of the example fiber ribbon interconnects discussed below are formed from a fiber ribbon cable 300, but the fiber ribbon interconnect as disclosed herein need not include the cover assembly 310. Furthermore, as noted above, the fiber ribbon interconnect disclosed herein can include only one connectorized end.

Connectorizing the fiber ribbon 200 with connectors to form a fiber ribbon interconnect typically requires extracting the fibers 10 from the common protective coating 210. This process can be done mechanically, though it may be relatively difficult as compared to conventional fiber ribbons. Thus, other stripping approaches, such as chemical stripping and thermal stripping, can be used. An example chemical stripping approach includes using hot sulfuric acid. An example thermal stripping process includes the use of a hot nitrogen jet.

Figure 6:
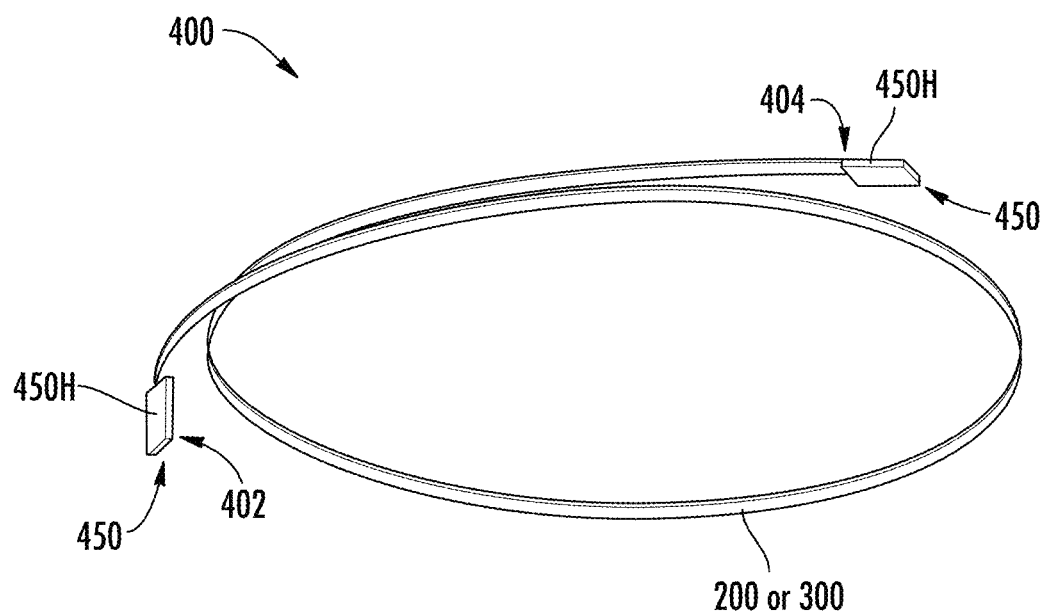
FIG. 6 is an elevated view of an example fiber ribbon interconnect that comprises the fiber ribbon cable connectorized at its opposite ends with optical fiber connectors.

FIG. 6 is an elevated view of an example fiber ribbon interconnect 400 that includes the fiber ribbon cable 300 terminated at the first and second ends 402 and 404 by respective optical fiber connectors ("connectors") 450. In an example, the connectors 450 can be the same or substantially the same connector. In an example, the one or both of the connectors 450 can be high-density connectors, denoted 450H. The term "high density" generally means a fiber density that is greater than a conventional optical fiber connector, such as an MPO connector, which typically has a fiber density (pitch) of 250 microns. In the discussion below, some connectors 450 can be standard-density connectors, and these are denoted 450S.

High-Density Connector Assembly

Figure 7A:
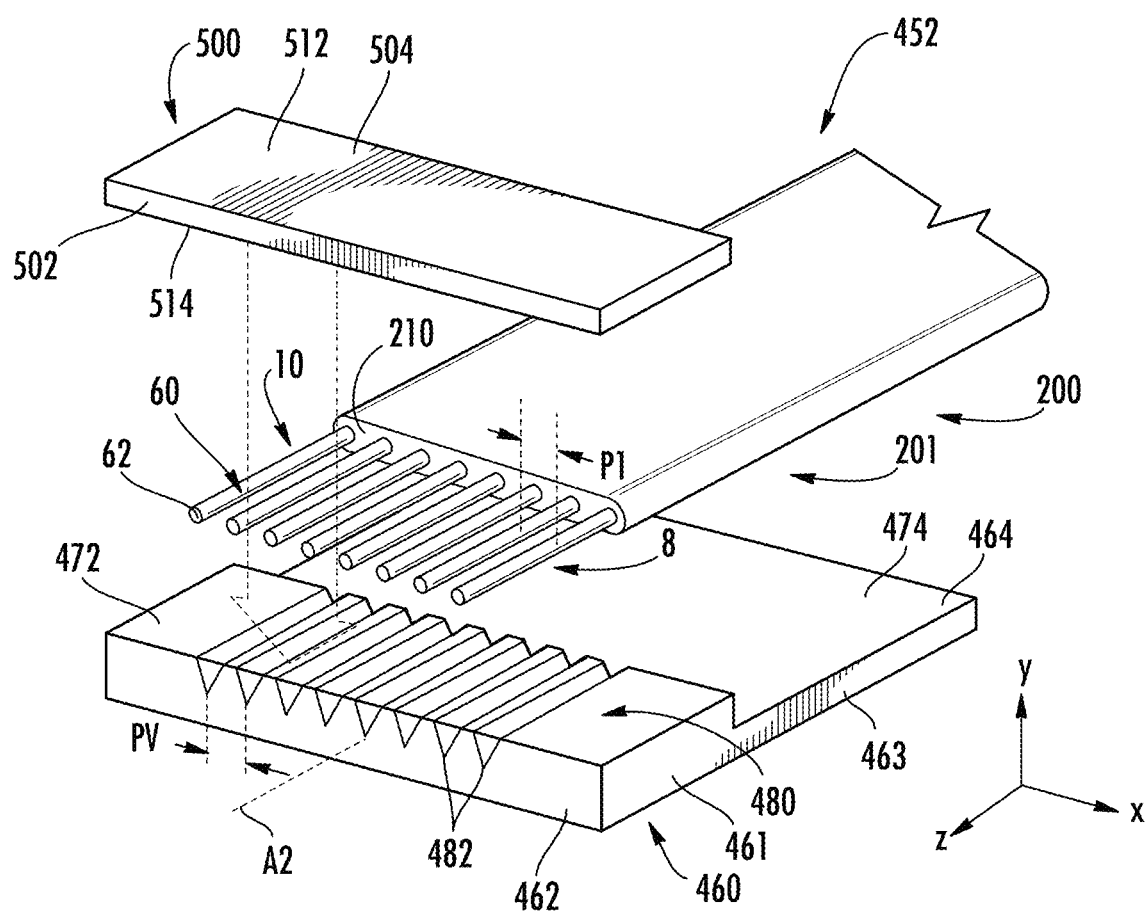
FIG. 7A is an exploded front elevated view of an example method of forming a high-density connector assembly that can be used directly as a high-density optical fiber connector or that can be used to form a high-density optical fiber connector.

FIG. 7A is an exploded front elevated view of an example method of forming a high-density connector assembly ("connector assembly") 452 that can be used directly as the high-density connector 450H or that can be used to form the high-density connector 450H (e.g., by adding further connector components, as discussed below).

The connector assembly 452 includes a grooved substrate 460 having a front-end section 461 with a front end 462, a back-end section 463 with a back end 464, and a central axis A2 that runs in the z-direction. The front-end section 461 has a planar top surface 472 while the back-end section 463 has a planar top surface 474 that is lower than the top surface 472 of the front section. The front-end section 461 includes an array 480 of grooves 482 formed in the planar top surface 472 and that run parallel to the central axis A2. In an example, the grooved substrate 460 comprises a glass or glass-based material. In an example, the grooves 482 are V-grooves, but other cross-sectional shapes for the grooves can also be effectively employed.

FIG. 7A shows the end sections 60 of the array 8 of fibers 10 of the fiber ribbon 200 extracted from the common protective coating 210. The grooves 480 of the front-end section 461 of the V-groove support substrate 460 are sized to accommodate the end sections 60 of the fibers 10 while the back-end section 463 accommodates the fiber ribbon 200, which in an example has been removed from the cover assembly 310 of a fiber ribbon cable 300 (e.g., a portion of the cover assembly has been stripped away). In an example, the fiber pitch P1 at the first end 202 of the fiber ribbon 200 is 125 µm and is closely matched to the pitch PV of standard 127 µm grooves 482.

Figure 7B:
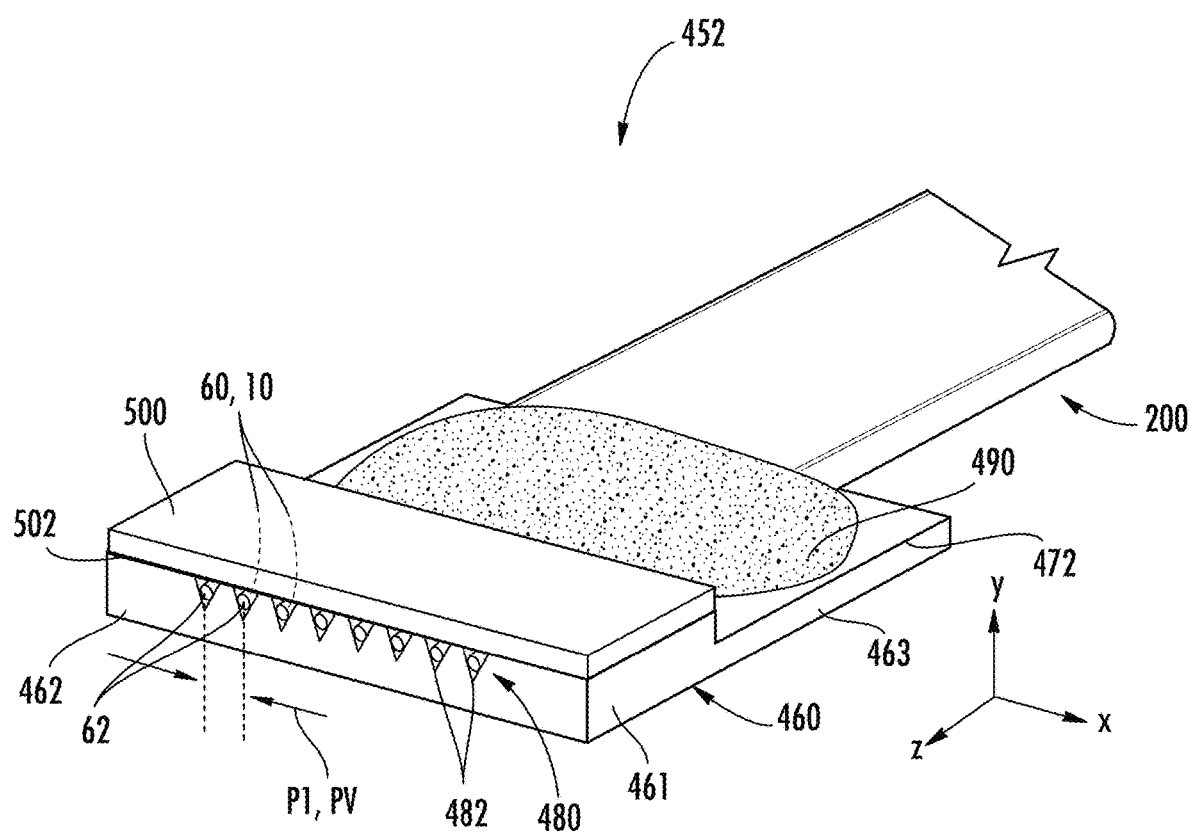
FIG. 7B is a front elevated view of the assembled high-density connector assembly.
Figure 7C:
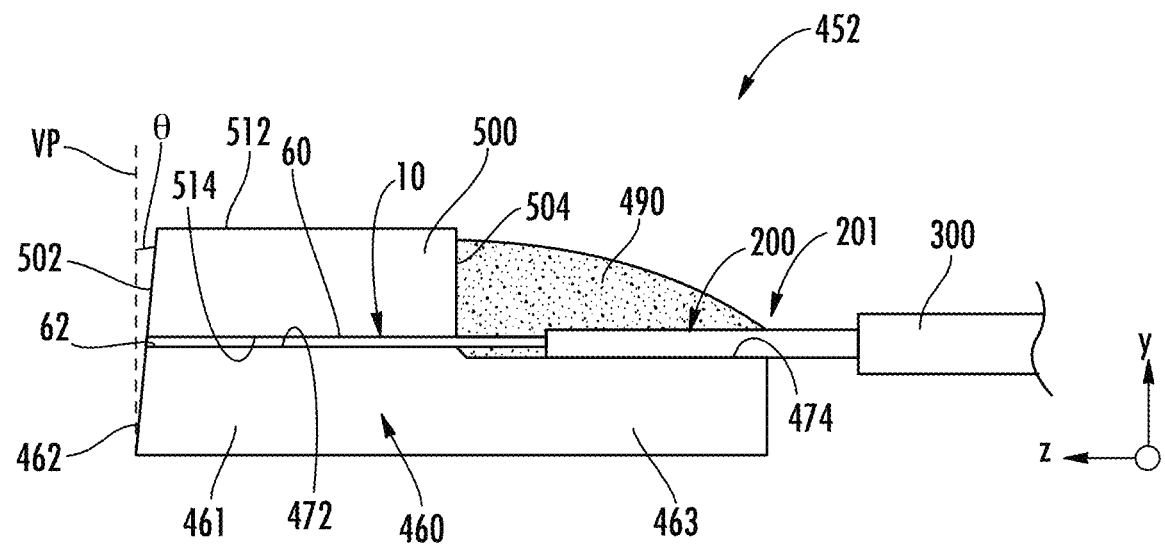
FIG. 7C is a cross-sectional view of the high-density connector assembly of FIG. 7B, illustrating an example of the cladding-strengthened glass optical fibers extracted from the protective coating of the fiber ribbon, and the fiber ribbon extracted from the cover assembly.

Once the end sections 60 of the fibers 10 are supported in the grooves 482, then with reference to FIGS. 7B and 7C, an adhesive 490 is applied to the fiber ribbon 200 at the back-end section 463. A cover 500 having a front end 502, a back end 504, a top surface 512 and a bottom surface 514 is then placed over the top of the array 480 of grooves 482 to secure the end sections 60 of the fibers 10 in the front-end section 461 of the grooved support substrate 460. The cover 500 is held in place by the adhesive 490 contacting the back end 504 of the cover. The adhesive 490 can also be added to the grooves 482. The cover 500 can be used to press the end sections 60 of the fibers 10 into their respective grooves 482. In an example, the cover 500 is a thin planar sheet made of a glass or a glass-based material.

FIG. 7B shows the resulting connector assembly 452, with the end faces 62 of the fibers 10 residing substantially at the front end 462 of the grooved substrate 460. The connector assembly 452 supports the fibers at a pitch P1 (wherein P1=PV), which can be the same as or different than the fiber pitch PR of the fiber ribbon 200. The fiber end faces 62 are typically polished once assembly of the connector assembly 452 is completed.

FIG. 7C is y-z cross-sectional view of the connector assembly 452 as attached to the end section 201 of the fiber ribbon 200, which is shown as incorporated into a cover assembly to form a fiber ribbon cable 300. In this case, a portion of the cover assembly 310 is stripped away to expose the first-end section 201 of the fiber ribbon 200. In an example, the front end 462 of the grooved substrate, the front end 502 of the cover 500 and the end face 62 of the fiber 10 define a tilt angle θ relative to a vertical plane VP to reduce reflection losses. In an example, the tilt angle θ can be up to about 8 degrees.

Figure 7D:
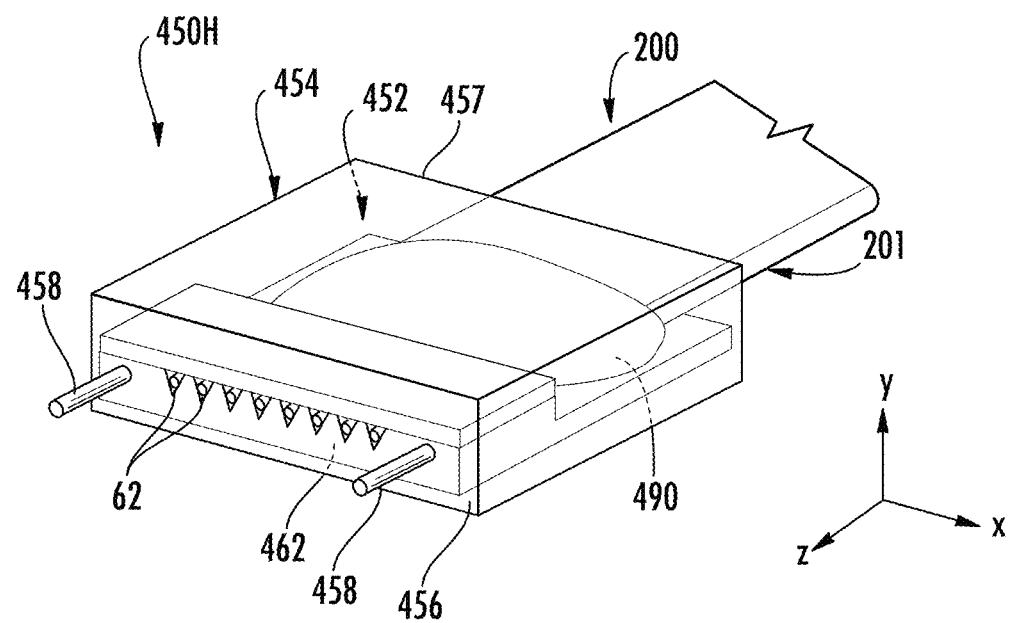
FIG. 7D is an elevated view illustrating how the high-density connector assembly of FIG. 7B can be used to form a high-density optical fiber connector by adding additional components in the form of a connector housing and alignment features.

FIG. 7D is similar to FIG. 7B and illustrates an example high-density connector 450H formed by at least partially enclosing the connector assembly 452 within a connector housing 454 having a front end 456 and a back end 457. In an example, the high-density connector 450 includes at least one alignment feature 458, which is shown by way of example as alignment pins that extend from the front end 456 of the connector housing to define a plug type connector. The at least one alignment feature 458 can also comprise alignment holes sized to receive alignment pins, thereby defining a receptacle type connector.

The front end 462 of the grooved substrate 460 is shown residing at or proximate to the front end 456 of the connector housing 450 while the fiber ribbon 200 extends from the back end 457 of the connector housing. In another example, the connector assembly 452 can extend from the front end 456 of the connector housing 454.

Fan-Out Fiber Ribbon

Figure 8A:
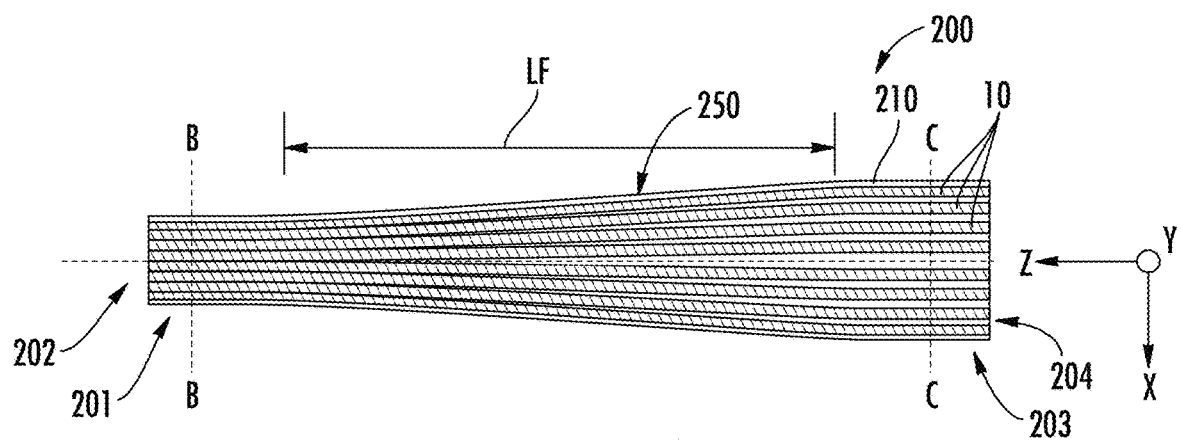
FIG. 8A is a top-down view of an example fan-out fiber ribbon.
Figure 8B:
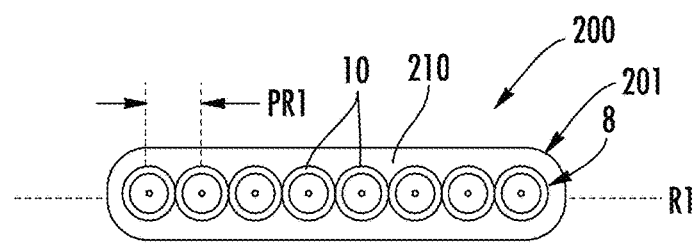
FIGS. 8B and 8C are x-y cross-sectional views of the fan-out fiber ribbon of FIG. 8A taken at the lines B-B and C-C respectively, and illustrating how the fiber pitch (density) can be made different at the opposite ends of the fan-out fiber ribbon using a fan-out region.
Figure 8C:
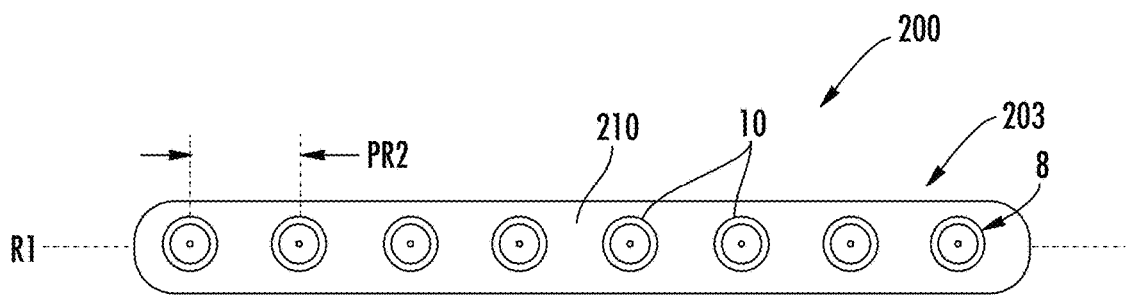

FIG. 8A is a top-down view of an example fiber ribbon 200 similar to that shown in FIG. 4A, except that the fiber pitch PR is not constant along the length of the fiber ribbon. FIGS. 8B and 8C are cross-sectional views of the fiber ribbon 200 as taken along the lines B-B and C-C respectively, and show two different fiber pitches PR1 and PR2 as a function of the z-position, and in particular at the front-end section 201 and the back-end section 203. In an example, the change in the fiber pitch PR occurs over a fan-out region 250 of length LF, with the fiber pitch PR1 in the front-end section 201 being substantially constant and the fiber pitch PR2 in the back-end section 203 being substantially constant. The length LF is called the transition length, and the fiber ribbon 200 with the fan-out region 250 is called a fan-out fiber ribbon. In an example, the fiber pitch PR1 at the first end 202 of the fiber ribbon 200 is in the range from 80 microns to 125 microns (which can also be the range of the diameter DF of the fiber 10) while the fiber pitch PR2 at the second end 204 is greater, such as that for a standard connector, e.g., 250 microns.

The transition length LF of the fan-out region 250 can be designed to minimize the bending stress on the fibers 10. As can be seen in FIG. 8A, the outermost fibers 10 experience the greatest amount of bending, i.e., the tightest bend radius. In an example, the shape of the fiber transition in the fan-out region 250 is designed to maximize the bend radius along the fiber's path. In one example, the fiber path is a half period of a cosine function, which is also known in the art of waveguide design as an "S-bend." For example, for an 8-fiber fan out, the outermost fiber 10 has an x position as a function of axial position z as given by $x=\{3.5 \cdot (PR2-PR1)/2\} \cdot \cos\{\pi z/LF\}$. In an example the transition length LF is about 10 mm, so that the minimum bend radius, which occurs at both ends of the transition, is at least 46 mm. The corresponding maximum tensile stress in the fiber 10 at this bend radius is about 14 kpsi, which is well within the capability of the fiber.

Reliability research of example fibers 10 showed a significantly increased fatigue resistance factor as compared to conventional fibers, even though the tensile strength of the fiber was on par or even slightly less than conventional fiber. As a result, while conventional fiber can one operate in the 20%~30% of proof tested stress level, examples of the fiber 10 are fatigue resistant and can operate at about 80% of proof test stress level.

Figure 9:
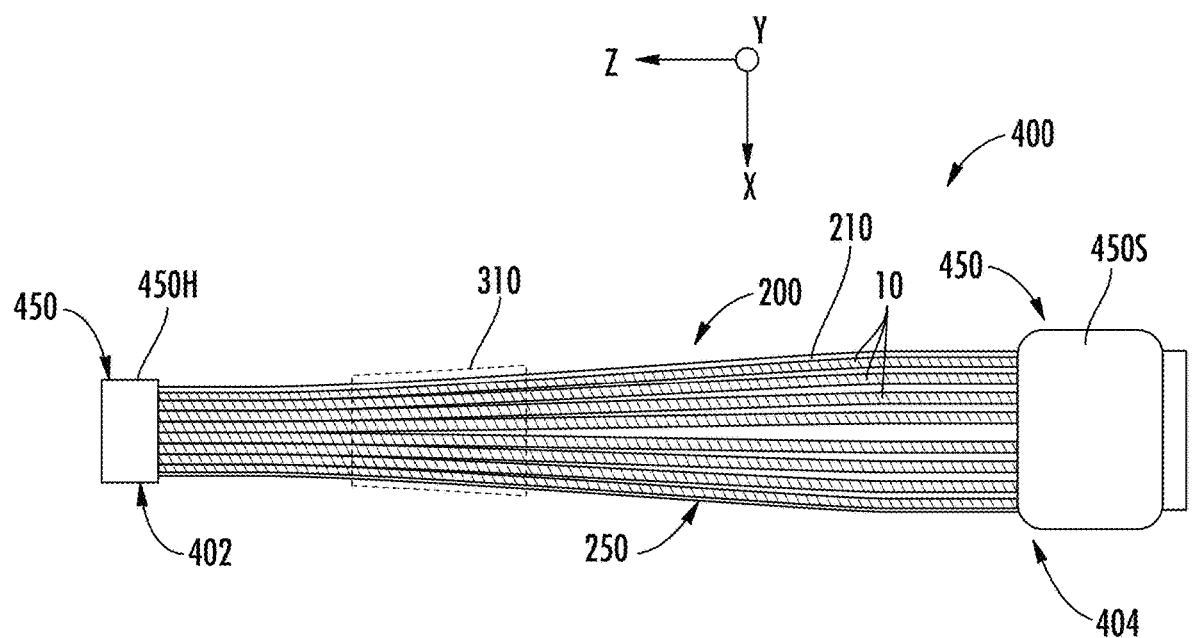
FIG. 9 is a top-down view of an example fiber ribbon interconnect that comprises the fan-out fiber ribbon of FIG. 8A with a high-density optical fiber connector operably attached to the high-density (narrow) end and a conventional (e.g., MPO) connector attached to the standard-density (wide) end.

FIG. 9 is a top-down view of an example fiber ribbon assembly 400 that includes the fan-out fiber ribbon 200 of FIG. 8A with a high-density connector 450H operably attached to the first (narrow) end 202 of the fan-out fiber ribbon and a standard-density connector 450S attached to the second (wide) end of the fan-out fiber ribbon. In an example, the standard-density connector 450S comprises an MPO connector that supports the fibers 10 at a standard pitch P2 of 250 microns. In an example, the fiber ribbon assembly 400 can include the cover assembly 310, only a portion of which is shown in dashed-line outline in FIG. 9 for ease of illustration.

Furcated Fiber Ribbon

Figure 10A:
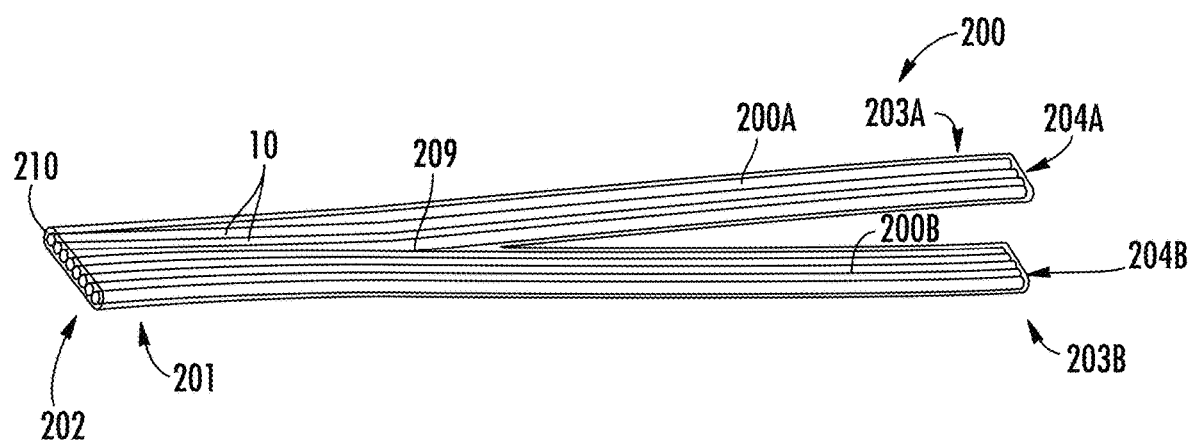
FIG. 10A is an elevated view of an example furcated fiber ribbon.

FIG. 10A is similar to FIG. 8A and illustrates an example embodiment of a furcated fiber ribbon 200 wherein the fiber ribbon is bifurcated at a furcation location 209 into two sub-sections (bifurcations) 200A and 200B having respective second ends 204A and 204B and each containing a sub-set of the total set (array) of fibers 10. This furcated configuration for the fiber ribbon 200 is useful for example when making optical connections to transmitters and receivers that reside on separate silicon-photonics chips. In other embodiments, there can be two or more furcations (200A, 200B, 200C, etc.), with the bifurcation embodiment shown by way of example. Also in an example the furcations need not have the same number of fibers 10 and need not have the same length. The furcation location 209 can also be selected for convenience based on the given connection application.

Figure 10B:
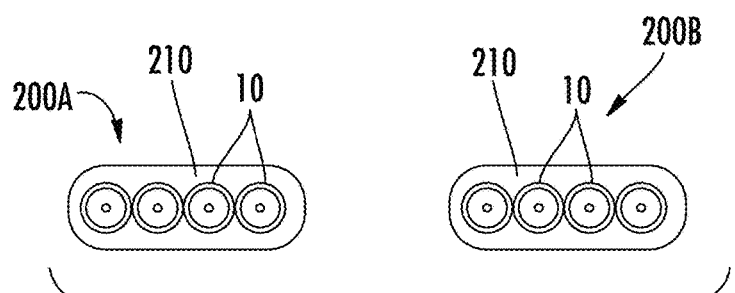
FIG. 10B is a cross-sectional view of each of the furcations of the furcated fiber ribbon of FIG. 10A.
Figure 10C:
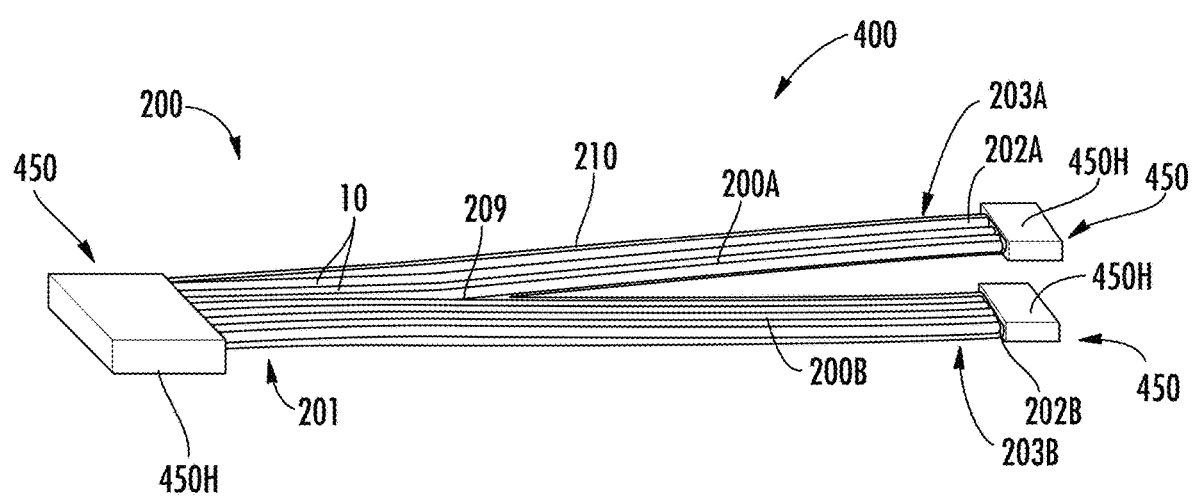
FIG. 10C is similar to FIG. 10A and shows an example interconnect that employs the furcated fiber ribbon.

FIG. 10B shows cross-sectional views of the example sub-sections 200A and 200B of the furcated fiber ribbon 200, wherein each sub-section includes four of the eight total fibers 10. In the example furcated fiber ribbon 200 of FIG. 10B, the first end section 201 of the furcated fiber ribbon 200 is unfurcated (see also FIG. 8B) and is terminated by a single connector 450 (e.g., high-density connector 450H) while the second end section 203 now comprises two end sections 203A and 203B with respective ends 204A and 204B each terminated by a connector 450 (e.g., high-density connectors 450H), as shown in FIG. 10C, to define an example fiber ribbon interconnect 400. In an example, the furcated fiber ribbon 200 can be incorporated into a furcated cover assembly 310 to form a furcated fiber ribbon cable 300.

Optical Data Transmission System

Figure 11A:
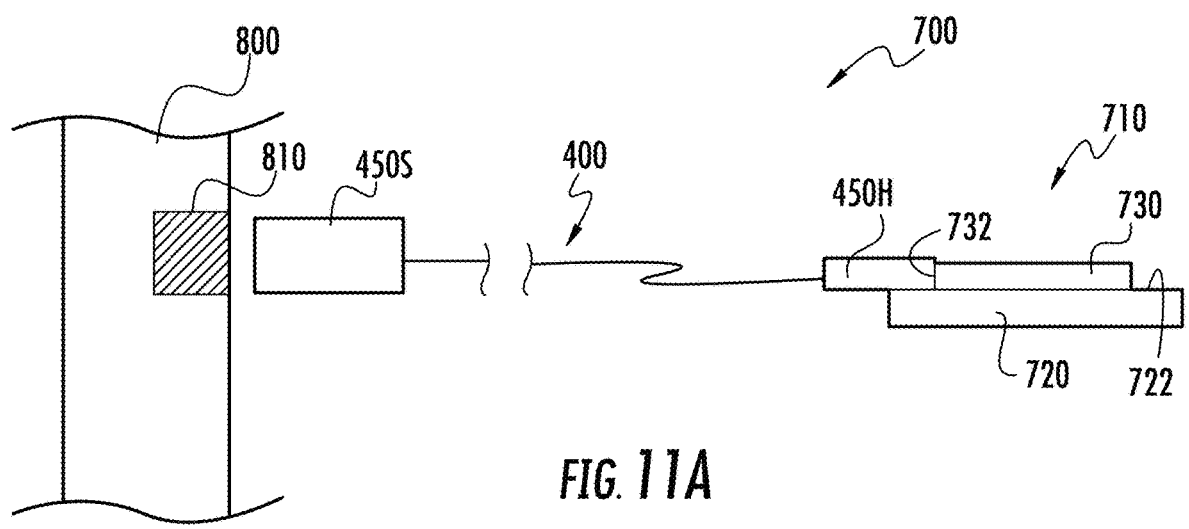
FIG. 11A is as schematic diagram of an optical data transmission system that employs the fiber ribbon as disclosed herein.

FIG. 11A is a schematic diagram of an example optical data transmission system 700. The optical data transmission system 700 comprises a photonic device 710 having a circuit board 720 having a top surface 722 and that operably supports a photonics chip 730, e.g., a silicon-photonics chip. The photonics chip 730 has a front end 732. The example optical data transmission system 700 also includes a telecommunications device 800 having a connector receptacle 810. The optical data transmission system 700 also includes an example fiber ribbon interconnect 400 with a high-density connector 450H and a standard-density connector 450S.

Figure 11B:
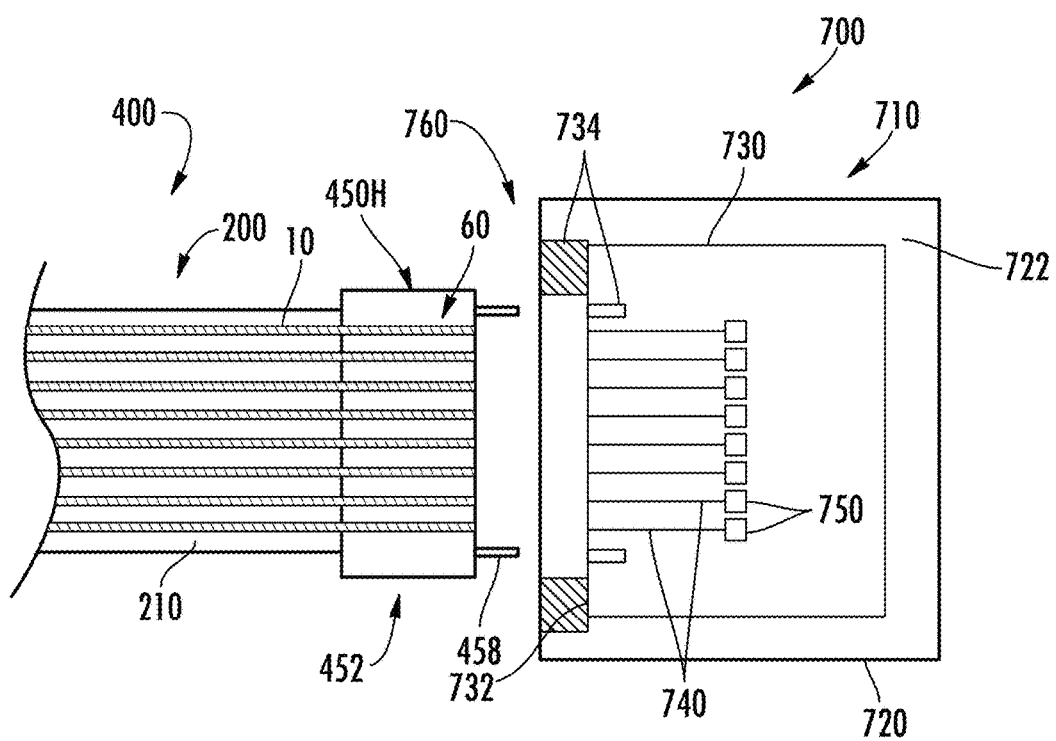
FIG. 11B is a close-up view of one end of the fiber ribbon connectorized with a high-density optical fiber connector, which is in position to operably engage a photonics chip of a photonic device.

FIG. 11B is a top-down view of an example photonic device 710. FIG. 11B also shows the high-density connector 450H at the first end 402 of the fiber ribbon interconnect 400 in position to operably engage the photonic device. The photonics chip 730 operably supports an array of optical waveguides 740. Eight optical waveguides 740 that terminate at the front end 732 of the photonics chip 730 are shown by way of example. In an example, the optical waveguides 740 comprise channel waveguides.

The photonics chip 730 may be fabricated from any material capable of having optical waveguides 740 disposed thereon or therein. As non-limiting examples, the photonics chip 730 may be fabricated from a glass-based material (e.g., glass, glass-ceramic, and fused silica) or a semiconductor material (e.g., silicon). The optical waveguides 740 may be configured as any known or yet-to-be-developed optical waveguides. Non-limiting example optical waveguides 740 include thin-film deposition, photolithographic masking and etching processes, laser written waveguides, ion-exchanged waveguides, optical waveguides, among others. It will be understood that the optical waveguides 740 may be suitably configured for the operations of the photonics chip 730 and are merely schematically depicted in a straight-line configuration.

The optical waveguides 740 are operably connected to respective active photonic elements 750, which in an example can comprise an optical transceiver, an optical light source (e.g., a vertical-cavity surface-emitting laser or VCSEL) or an optical detector. In an example, the photonics chip 730 can comprise a first sub-chip that includes the optical waveguides 740 and a second sub-chip that includes the active photonic elements 750.

In an example, the photonics chip 730 is configured to generate and/or receive optical data signals using the active photonic elements 750 and the optical waveguides 740. The optical waveguides 740 terminate the front end 732 of the photonics chip 730. The front end 732 of the photonics chip 730 can include one or more alignment features 734, which are shown by way of example as alignment holes. In an example, the front 732 and the one or more alignment features 734 define an optical connector 760, which is shown by way of example as receptacle type of optical connector that complements the plug type of high-density connector 450H of the fiber ribbon interconnect 400 and that allows for mating and de-mating of the photonic device 710 with the fiber ribbon interconnect to establish optical communication between the optical waveguides of the photonics chip 730 and the fibers 10 of the fiber ribbon interconnect.

Figure 11C:
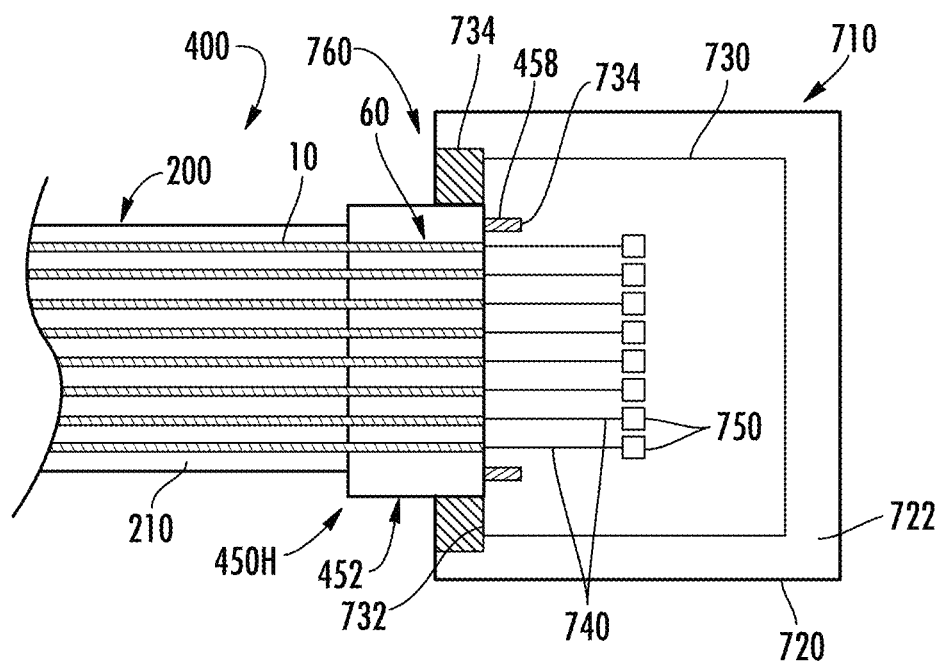
FIG. 11C is similar to FIG. 11B and shows the high-density optical fiber connector operably engaged with the photonics chip of the photonic device so that the cladding-strengthened glass optical fibers are in optical communication with optical waveguides supported by the photonics chip.

Also shown in FIG. 11B is the connector high-density connector 450 having one or more alignment features 458 that are complementary to the one or more alignment features 734 of the photonic device 710. The example alignment features 458 are shown in the form of alignment pins sized and configured to closely engage the alignment holes 734 when the high-density connector 450 is operably engaged with the photonic device 730, as shown in FIG. 11C. The photonic device 710 is shown as having additional alignment features 734 that help guide the second connector into position relative to the photonics chip 730. The optical waveguides 740 have a pitch that matches that of the fibers 10 supported by the connector 450 so that when the high-density connector 450 is operably engaged with the photonic device 730, the fibers 10 are in optical communication with respective optical waveguides 740. The optical waveguides 740 have a high waveguide density, i.e., greater than that associated with standard connectors used in standard optical fiber cables.

At the other end of the ribbon interconnect 200, the standard-density connector 450S is operably engaged with the connector receptacle 610 of the telecommunications device 600. The telecommunications device 600 can be a wide variety of standard telecommunication devices known in the art, such as a server, a fiber optic cable, an electronics panel in a data center, etc. The standard-density connector 450S has the aforementioned standard fiber density associated with industry standard telecommunication systems and devices.

Figure 11D:
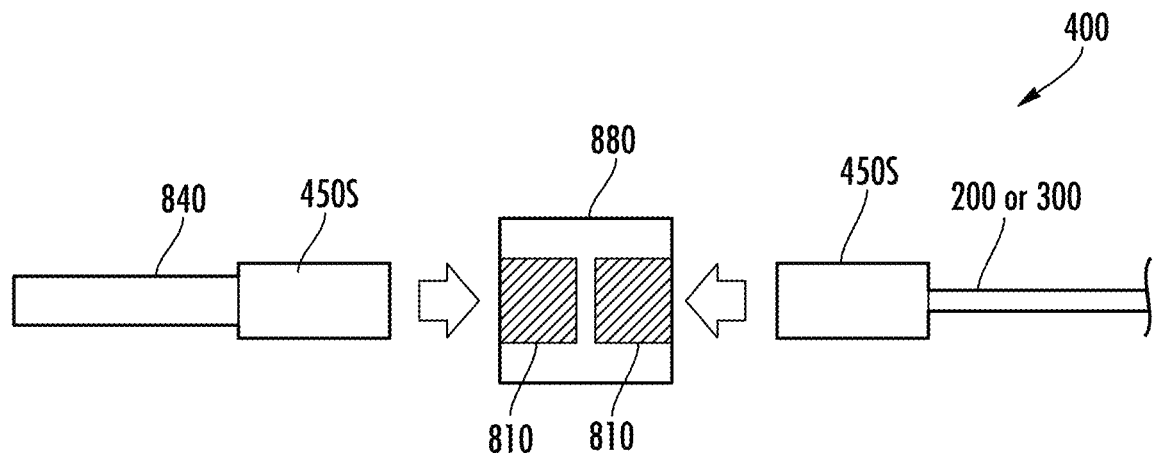
FIG. 11D is a side view of a connectorized end of an example fiber ribbon interconnect, wherein the connectorized end includes a standard connector, and illustrating an example of how the fiber ribbon interconnect can be optically connected to a standard optical fiber cable using an adapter.

With reference to FIG. 11D, in the example where the telecommunications device 800 is a fiber optic cable 840 terminated by a standard-density connector 450S, the connector receptacle 810 can be defined by a connector adapter 880 having two connector receptacles and used to operably connect optical fiber cables as is known in the art. Thus, in an example, the ribbon interconnect 400 disclosed herein can be used to optically connect a photonic device 710 having a high waveguide density to a remote telecommunications device 800 having a standard fiber density.

Figure 11E:
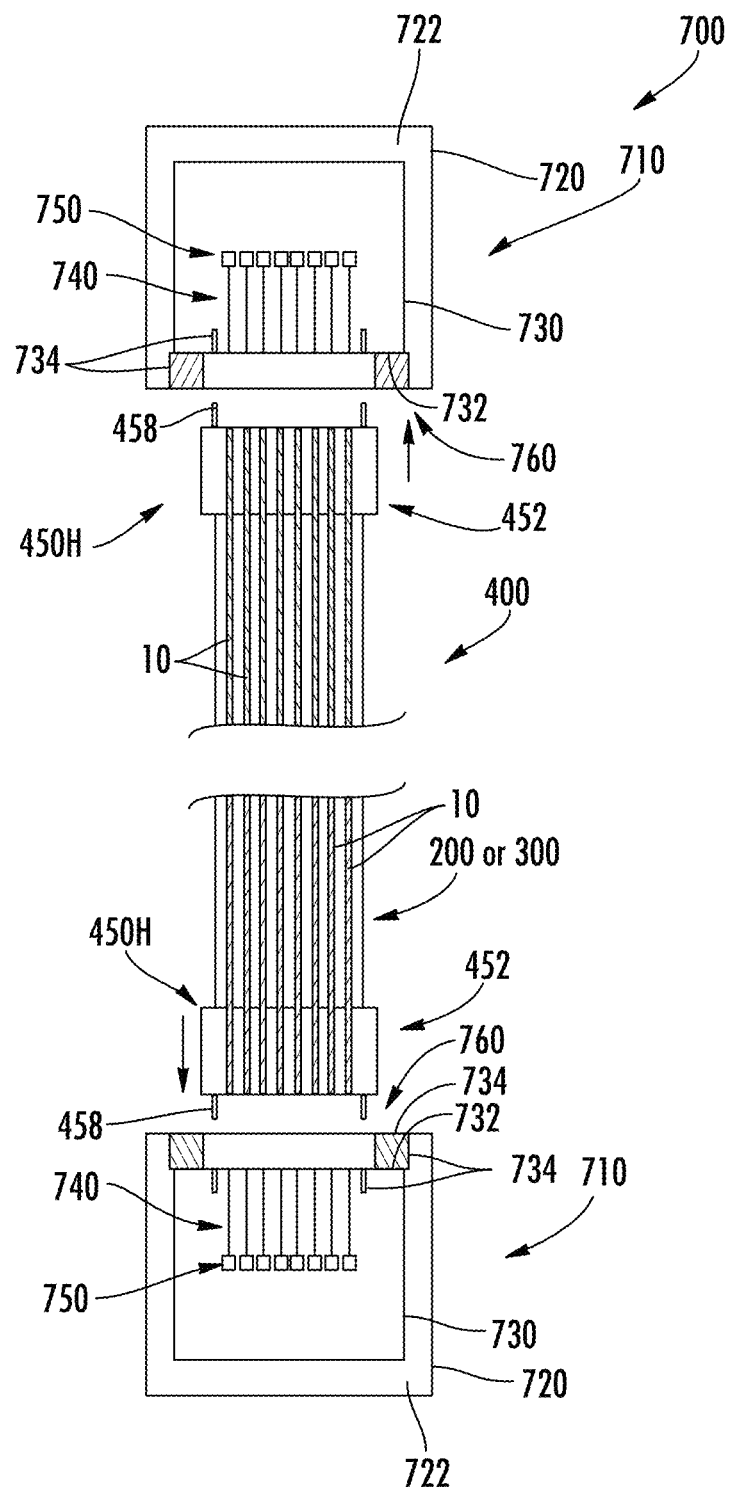
FIG. 11E is a top-down view of an example of an optical data transmission system wherein a fiber ribbon interconnect terminated by two high-density optical connectors is used to optically connect two different photonic devices.

In another example of the optical data transmission system 700 illustrated in FIG. 11E, the ribbon interconnect 400 can be used to establish optical data communication between one photonic device 710 and another photonic device.

Figure 11F:
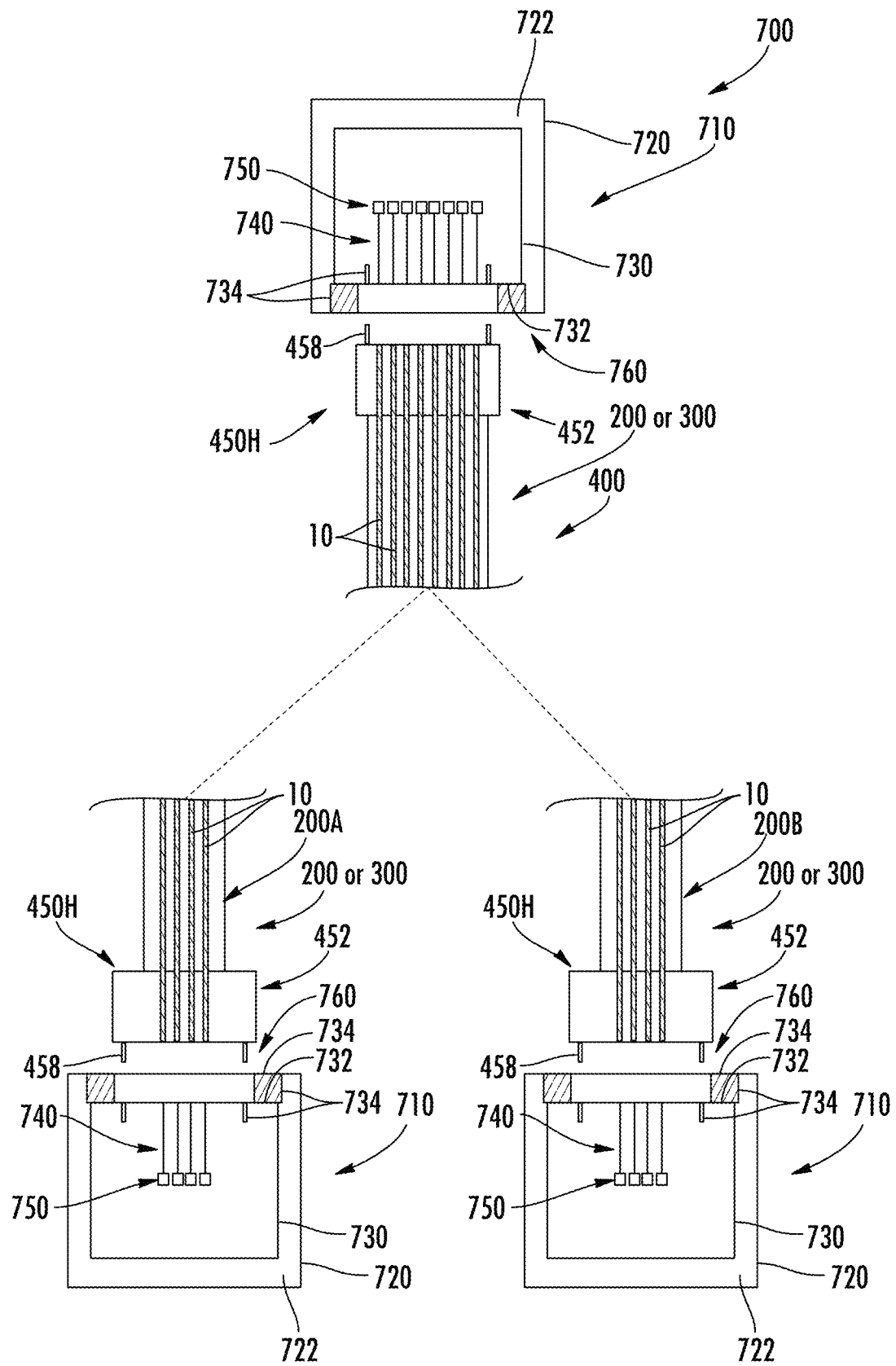
FIG. 11F is similar to FIG. 11E and shows an example of an optical data transmission system wherein the fiber ribbon interconnect utilizes a bifurcated fiber ribbon to provide high-density optical interconnections between one photonic device at one end of the fiber ribbon interconnect and two photonic devices at the other end of the fiber ribbon interconnect.

FIG. 11F is similar to FIG. 11E and shows an example of an optical data transmission system 700 wherein the fiber ribbon interconnect 500 utilizes a bifurcated fiber ribbon 200 to provide high-density optical interconnections between one photonic device 710 at the first end 402 of the fiber ribbon interconnect 400 and two photonic devices 710 at the second ends 404 of the fiber ribbon interconnect.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A fiber ribbon, comprising:
   two or more cladding-strengthened glass optical fibers each having an inner core, an outer cladding, and an outer surface defined by the outer cladding, wherein the outer cladding comprises silica glass; and
   a common protective coating that comprises an organic polymer material that directly contacts the silica glass of the outer surfaces of the two or more cladding-strengthened glass optical fibers such that the two or more cladding-strengthened glass optical fibers do not include individual protective polymer coatings.

2. The fiber ribbon according to claim 1, further comprising:
   a first optical connector at a first end of the fiber ribbon, wherein the first optical connector comprises: a grooved substrate with grooves sized to accommodate end sections of the two or more cladding-strengthened glass optical fibers that extend from the common protective coating, and a cover for covering the end sections of the two or more cladding-strengthened glass optical fibers in the grooves.

3. The fiber ribbon according to claim 2, wherein the first optical connector further comprises a connector housing that at least partially surrounds the grooved substrate and the cover.

4. The fiber ribbon according to claim 1, further comprising a cover assembly that at least partially surrounds the fiber ribbon.

5. The fiber ribbon according to claim 1, wherein the fiber ribbon comprises a first end section that includes a first end of the fiber ribbon, a second end section that includes a second end of the fiber ribbon, and a fan-out region between the first end section and the second end section.

6. The fiber ribbon according to claim 5, wherein the first end section has a first fiber pitch $PR1 \leq 100$ μm and the second end section has a second fiber pitch $PR2$ of 250 μm or 125 μm.

7. The fiber ribbon according to claim 6, wherein the fan-out region has an S-bend configuration and comprises a transition length $LF$ in the range from about 5 mm to about 50 mm.

8. The fiber ribbon according to claim 1, wherein each of the two or more cladding-strengthened glass optical fibers contacts at least one other of the two or more cladding-strengthened glass optical fibers.

9. The fiber ribbon according to claim 1, wherein the organic polymer material of the common protective coating directly contacts an entirety of the outer surface of each cladding-strengthened glass optical fiber of the two or more cladding-strengthened glass optical fibers.

10. A fiber ribbon, comprising:
two or more cladding-strengthened glass optical fibers each having an inner core, an outer cladding, and an outer surface that is defined by or within 100 nm of the outer cladding, wherein the outer surface comprises an inorganic material; and
a common protective coating that comprises an organic polymer material that directly contacts the inorganic material of the outer surface of the two or more cladding-strengthened glass optical fibers such that the two or more cladding-strengthened glass optical fibers do not include individual protective polymer coatings.

11. The fiber ribbon according to claim 10, wherein each cladding-strengthened glass optical fiber of the two or more cladding-strengthened glass optical fibers includes a hermetic coating defining the outer surface of the cladding-strengthened glass optical fiber.

12. The fiber ribbon according to claim 10, wherein the outer cladding of each of the two more cladding-strengthened glass optical fibers defines the outer surface that is directly contacted by the organic polymer material of the common protective coating.

13. The fiber ribbon according to claim 10, wherein each of the two or more cladding-strengthened glass optical fibers contacts at least one other of the two or more cladding-strengthened glass optical fibers.

14. The fiber ribbon according to claim 10, wherein the fiber ribbon comprises a first end section that includes a first end of the fiber ribbon, a second end section that includes a second end of the fiber ribbon, and a fan-out region between the first end section and the second end section.

15. The fiber ribbon according to claim 14, wherein the first end section has a first fiber pitch PR1 ≤100 μm and the second end section has a second fiber pitch PR2 of 250 μm or 125 μm.

16. The fiber ribbon according to claim 15, wherein the fan-out region has an S-bend configuration and comprises a transition length LF in the range from about 5 mm to about 50 mm.

17. The fiber ribbon according to claim 10, further comprising:
a first optical connector at a first end of the fiber ribbon, wherein the first optical connector comprises: a grooved substrate with grooves sized to accommodate end sections of the two or more cladding-strengthened glass optical fibers that extend from the common protective coating, and a cover for covering the end sections of the two or more cladding-strengthened glass optical fibers in the grooves.

18. The fiber ribbon according to claim 17, wherein the first optical connector further comprises a connector housing that at least partially surrounds the grooved substrate and the cover.

* * * * *